US012693554B2

(12) United States Patent
Chalberg, Jr. et al.

(10) Patent No.: US 12,693,554 B2
(45) Date of Patent: Jul. 28, 2026

(54) LIGHT SCATTERING LENS FOR TREATING MYOPIA AND EYEGLASSES CONTAINING THE SAME

(71) Applicant: SIGHTGLASS VISION, INC., Palo Alto, CA (US)

(72) Inventors: Thomas W. Chalberg, Jr., Menlo Park, CA (US); Peter Hones, Menlo Park, CA (US)

(73) Assignee: SightGlass Vision, Inc., Dallas, TX (US)

( * ) Notice: Subject to any disclaimer, the term of this patent is extended or adjusted under 35 U.S.C. 154(b) by 734 days.

(21) Appl. No.: 17/298,522

(22) PCT Filed: Dec. 2, 2019

(86) PCT No.: PCT/US2019/063982
§ 371 (c)(1),
(2) Date: May 28, 2021

(87) PCT Pub. No.: WO2020/113212
PCT Pub. Date: Jun. 4, 2020

(65) Prior Publication Data
US 2022/0011602 A1      Jan. 13, 2022

Related U.S. Application Data

(60) Provisional application No. 62/773,577, filed on Nov. 30, 2018.

(51) Int. Cl.
*G02C 7/16*          (2006.01)
*G02C 7/02*          (2006.01)
*G02C 7/06*          (2006.01)

(52) U.S. Cl.
CPC ............... *G02C 7/16* (2013.01); *G02C 7/022* (2013.01); *G02C 7/061* (2013.01); *G02C 2202/24* (2013.01)

(58) Field of Classification Search
CPC .......... G02C 7/06; G02C 7/061; G02C 7/022; G02C 7/14; G02C 7/16; G02C 2202/24;
(Continued)

(56) References Cited

U.S. PATENT DOCUMENTS 149,270  A      3/1874  Watson
338,003  A      3/1886  Ward
(Continued)

FOREIGN PATENT DOCUMENTS

AU          2005289302          4/2006
CN            1909860            2/2007
(Continued)

OTHER PUBLICATIONS

Extended Search Report in European Application No. 19891622.3, dated Jul. 27, 2022, 12 pages.
(Continued)

*Primary Examiner* — Bumsuk Won
*Assistant Examiner* — Samanvitha Sridhar
(74) *Attorney, Agent, or Firm* — Fish & Richardson P.C.

(57)          ABSTRACT
An ophthalmic lens includes a lens material having two curved surfaces opposing each other; a light scattering region; a first aperture (e.g., clear or with reduced scattering density/power compared to the light scattering region) surrounded by the light scattering region; and a second aperture (e.g., clear or with reduced scattering density/power compared to the light scattering region) separated from the first clear aperture by a portion of the light scattering region.

17 Claims, 14 Drawing Sheets

(58) Field of Classification Search
CPC ............ G02C 2202/06; G02C 2202/20; G02C 5/003; G02B 5/02
See application file for complete search history.

(56) References Cited

U.S. PATENT DOCUMENTS

| | | | |
|---|---|---|---|
| 506,983 A | 10/1893 | Diemmer et al. | |
| 712,466 A | 10/1902 | Taylor | |
| 3,507,566 A | 4/1970 | Knapp | |
| 4,168,111 A | 9/1979 | Baines | |
| 4,194,814 A | 3/1980 | Fischer et al. | |
| 4,338,003 A | 7/1982 | Adrian | |
| 4,704,016 A | 11/1987 | de Carle | |
| 4,710,327 A | 12/1987 | Neefe | |
| 4,909,818 A | 3/1990 | Jones | |
| 5,034,100 A | 7/1991 | Sides | |
| 5,260,727 A * | 11/1993 | Oksman | G02C 7/16 |
| | | | 351/159.03 |
| 5,585,968 A | 12/1996 | Guhman et al. | |
| 5,800,992 A | 9/1998 | Fodor et al. | |
| 5,837,461 A | 11/1998 | Neitz | |
| 5,867,247 A | 2/1999 | Martin et al. | |
| 5,905,561 A | 5/1999 | Lee et al. | |
| 5,926,250 A | 7/1999 | Mukaiyama et al. | |
| 6,149,270 A | 11/2000 | Hayashi | |
| 6,343,861 B1 | 2/2002 | Kris et al. | |
| 6,582,908 B2 | 6/2003 | Fodor et al. | |
| 6,706,867 B1 | 3/2004 | Lorenz | |
| 6,712,466 B2 | 3/2004 | Dreher | |
| 6,712,467 B1 | 3/2004 | Kitani | |
| 6,754,299 B2 | 6/2004 | Patch | |
| 6,997,554 B2 | 2/2006 | Nakada et al. | |
| 7,025,460 B2 | 4/2006 | Smitth et al. | |
| 7,506,983 B2 | 3/2009 | To et al. | |
| 7,604,351 B2 | 10/2009 | Fukuma et al. | |
| 7,665,842 B2 | 2/2010 | Ho et al. | |
| 7,766,482 B2 | 8/2010 | Smith et al. | |
| 7,862,171 B2 | 1/2011 | Varnas et al. | |
| 7,901,075 B2 | 3/2011 | Rooney et al. | |
| 7,992,997 B2 | 8/2011 | Varnas | |
| 7,997,727 B2 | 8/2011 | Ho et al. | |
| 8,052,278 B2 | 11/2011 | Bovet | |
| 8,057,034 B2 | 11/2011 | Ho et al. | |
| 8,079,702 B2 | 12/2011 | Ballet | |
| 8,115,792 B2 | 2/2012 | Petsch et al. | |
| 8,162,477 B2 | 4/2012 | Carimalo et al. | |
| 8,240,847 B2 | 8/2012 | Holden et al. | |
| RE43,851 E | 12/2012 | To et al. | |
| 8,342,684 B2 | 1/2013 | Ho et al. | |
| 8,500,278 B2 | 8/2013 | Lo et al. | |
| 8,540,365 B2 | 9/2013 | Varnas | |
| 8,684,520 B2 | 4/2014 | Lindacher et al. | |
| 8,690,319 B2 | 4/2014 | Menezes | |
| 8,807,747 B2 | 8/2014 | Guilloux et al. | |
| RE45,147 E | 9/2014 | To et al. | |
| 8,833,936 B2 | 9/2014 | Varnas | |
| 8,926,092 B2 | 1/2015 | Weeber | |
| 8,931,897 B2 | 1/2015 | Holden et al. | |
| 8,950,860 B2 | 2/2015 | Tse et al. | |
| 8,951,729 B2 | 2/2015 | Neitz et al. | |
| 8,992,010 B2 | 3/2015 | Ho et al. | |
| 8,998,408 B2 | 4/2015 | Wei et al. | |
| 9,360,683 B2 | 6/2016 | Buehren | |
| 9,417,463 B2 | 8/2016 | Brennan et al. | |
| 9,423,633 B2 | 8/2016 | Ho et al. | |
| 9,547,182 B2 | 1/2017 | Collins et al. | |
| 9,594,259 B2 | 3/2017 | Brennan et al. | |
| 9,625,739 B2 | 4/2017 | Brennan et al. | |
| 9,709,819 B2 | 7/2017 | Lippens et al. | |
| 9,720,253 B2 | 8/2017 | Neitz et al. | |
| 9,733,494 B2 | 8/2017 | Brennan et al. | |
| 9,746,693 B2 | 8/2017 | Peloux et al. | |
| 9,829,722 B2 | 11/2017 | Tse et al. | |
| 10,012,849 B2 | 7/2018 | Collins et al. | |
| RE47,006 E | 8/2018 | To et al. | |
| 10,042,091 B2 | 8/2018 | Kildishev et al. | |
| 10,061,143 B2 | 8/2018 | Brennan et al. | |
| 10,156,737 B2 | 12/2018 | Martinez et al. | |
| 10,203,522 B2 | 2/2019 | Bakaraju et al. | |
| 10,231,897 B2 | 3/2019 | Tse et al. | |
| 10,247,964 B2 | 4/2019 | Sankaridurg et al. | |
| 10,268,050 B2 | 4/2019 | To et al. | |
| 10,302,962 B2 | 5/2019 | Neitz et al. | |
| 10,429,670 B2 | 10/2019 | Newman | |
| 10,571,717 B2 | 2/2020 | Neitz et al. | |
| 10,787,707 B2 | 9/2020 | Neitz et al. | |
| 10,795,181 B2 | 10/2020 | Neitz et al. | |
| 10,884,264 B2 | 1/2021 | Hones et al. | |
| 11,048,102 B2 | 6/2021 | Neitz | |
| 2002/0140900 A1 | 10/2002 | Streibig | |
| 2003/0082576 A1 | 5/2003 | Jones et al. | |
| 2004/0110179 A1 | 6/2004 | Shuber | |
| 2004/0150787 A1 | 8/2004 | Niculas | |
| 2005/0174533 A1 | 8/2005 | Renard | |
| 2005/0208555 A1 | 9/2005 | Raimond | |
| 2006/0082729 A1 | 4/2006 | To et al. | |
| 2006/0235428 A1 | 10/2006 | Silvestrini | |
| 2006/0285071 A1 | 12/2006 | Erickson et al. | |
| 2007/0026167 A1 | 2/2007 | Bourdelais et al. | |
| 2007/0115431 A1 | 5/2007 | Smith et al. | |
| 2007/0159601 A1* | 7/2007 | Ho | G02C 7/02 |
| | | | 351/221 |
| 2007/0247588 A1 | 10/2007 | Cano | |
| 2007/0296916 A1 | 12/2007 | Holden et al. | |
| 2008/0030675 A1 | 2/2008 | Dillon | |
| 2008/0084534 A1 | 4/2008 | Lindacher et al. | |
| 2008/0151183 A1 | 6/2008 | Altmann | |
| 2008/0221674 A1 | 9/2008 | Blum et al. | |
| 2008/0309882 A1 | 12/2008 | Thom et al. | |
| 2009/0059168 A1 | 3/2009 | Miller et al. | |
| 2009/0310082 A1 | 12/2009 | Varnas | |
| 2010/0021889 A1 | 1/2010 | Juo | |
| 2010/0053550 A1 | 3/2010 | Giraudet | |
| 2010/0091240 A1 | 4/2010 | Drobe et al. | |
| 2010/0149488 A1 | 6/2010 | Lo et al. | |
| 2011/0013137 A1 | 1/2011 | Kitani | |
| 2011/0037944 A1* | 2/2011 | Varnas | G02C 7/063 |
| | | | 351/159.42 |
| 2011/0051079 A1 | 3/2011 | Martinez et al. | |
| 2011/0194195 A1 | 8/2011 | Zalevsky et al. | |
| 2011/0313058 A1 | 12/2011 | Neitz et al. | |
| 2012/0014977 A1 | 1/2012 | Furihata | |
| 2012/0016645 A1 | 1/2012 | Altheimer et al. | |
| 2012/0062836 A1 | 3/2012 | Tse et al. | |
| 2012/0182520 A1 | 7/2012 | Neitz et al. | |
| 2013/0053425 A1 | 2/2013 | To et al. | |
| 2013/0103147 A1 | 4/2013 | Christie et al. | |
| 2013/0107206 A1 | 5/2013 | Slater | |
| 2014/0080900 A1 | 3/2014 | Neitz et al. | |
| 2014/0111763 A1 | 4/2014 | Griffin | |
| 2015/0036102 A1 | 2/2015 | Ghosh et al. | |
| 2015/0109574 A1 | 4/2015 | Tse et al. | |
| 2015/0111782 A1 | 4/2015 | Neitz et al. | |
| 2015/0286071 A1 | 10/2015 | Peloux et al. | |
| 2015/0316788 A1 | 11/2015 | Holden et al. | |
| 2015/0331255 A1 | 11/2015 | Sankaridurg et al. | |
| 2016/0026000 A1 | 1/2016 | Kester | |
| 2016/0143801 A1 | 5/2016 | Lam et al. | |
| 2016/0377884 A1 | 12/2016 | Lau et al. | |
| 2017/0115509 A1 | 4/2017 | Brennan et al. | |
| 2017/0131567 A1 | 5/2017 | To et al. | |
| 2017/0168320 A1 | 6/2017 | Tsubota et al. | |
| 2017/0184875 A1 | 6/2017 | Newman | |
| 2017/0189168 A1 | 7/2017 | Zickler et al. | |
| 2017/0192252 A1 | 7/2017 | Brennan et al. | |
| 2017/0276963 A1 | 9/2017 | Brennan et al. | |
| 2017/0292160 A1 | 10/2017 | Neitz et al. | |
| 2017/0336653 A1 | 11/2017 | Bakaraju | |
| 2018/0112268 A1 | 4/2018 | Neitz et al. | |
| 2018/0275425 A1 | 9/2018 | Collins et al. | |
| 2018/0275427 A1 | 9/2018 | Lau et al. | |
| 2019/0033619 A1* | 1/2019 | Neitz | B29D 11/00336 |
| 2019/0235279 A1 | 8/2019 | Hones et al. | |
| 2019/0302477 A1 | 10/2019 | Neitz et al. | |

(56) References Cited

U.S. PATENT DOCUMENTS

| | | | | |
|---|---|---|---|---|
| 2020/0073147 A1* | 3/2020 | Bakaraju | | G02C 7/022 |
| 2020/0089023 A1 | 3/2020 | Zhou et al. | | |
| 2020/0271955 A1 | 8/2020 | Neitz et al. | | |
| 2020/0393699 A1 | 12/2020 | Neitz | | |
| 2021/0165244 A1 | 6/2021 | Hones et al. | | |
| 2021/0341753 A1 | 11/2021 | Neitz | | |

FOREIGN PATENT DOCUMENTS

| | | |
|---|---|---|
| CN | 2884247 | 3/2007 |
| CN | 2924572 | 7/2007 |
| CN | 101198434 | 6/2008 |
| CN | 101273882 | 10/2008 |
| CN | 201331632 | 10/2009 |
| CN | 101595420 | 12/2009 |
| CN | 101730500 | 6/2010 |
| CN | 201673335 | 12/2010 |
| CN | 102238927 | 11/2011 |
| CN | 103097940 | 5/2013 |
| CN | 103268023 | 8/2013 |
| CN | 203502693 | 3/2014 |
| CN | 103959138 | 7/2014 |
| CN | 104094164 | 10/2014 |
| CN | 104094165 | 10/2014 |
| CN | 104678572 | 6/2015 |
| CN | 105378545 | 3/2016 |
| CN | 102892380 | 10/2016 |
| CN | 106291978 A | 1/2017 |
| CN | 107632412 | 1/2018 |
| EP | 0457612 | 11/1991 |
| EP | 1799166 | 6/2007 |
| EP | 2131721 | 12/2009 |
| EP | 2616876 | 7/2013 |
| EP | 2962155 | 1/2016 |
| EP | 2379028 | 9/2017 |
| EP | 2548533 | 2/2018 |
| EP | 3667401 | 6/2020 |
| HK | 1210838 | 5/2016 |
| JE | 2013537317 | 9/2013 |
| JP | S5829627 | 2/1983 |
| JP | 2004514921 | 5/2004 |
| JP | 2008040497 | 2/2008 |
| JP | 2008514318 | 5/2008 |
| JP | 4891249 | 3/2012 |
| JP | 2012513252 | 6/2012 |
| JP | 2012515933 | 7/2012 |
| JP | 201438247 | 2/2014 |
| JP | 2017510851 | 4/2017 |
| JP | 2019529968 | 10/2019 |
| KR | 100686551 | 2/2007 |
| KR | 100840845 | 6/2008 |
| KR | 1020150119732 | 10/2015 |
| KR | 1020180047478 | 5/2018 |
| TW | 279510 | 6/1996 |
| TW | 201211618 | 3/2012 |
| TW | 201307942 | 2/2013 |
| TW | I530727 | 4/2016 |
| TW | I559044 | 11/2016 |
| TW | I561885 | 12/2016 |
| TW | I603754 B | 11/2017 |
| WO | WO1986/006846 | 11/1986 |
| WO | WO1997/031286 | 8/1997 |
| WO | WO1999/066366 | 12/1999 |
| WO | WO2000/052516 | 9/2000 |
| WO | WO2002/031585 | 4/2002 |
| WO | WO2006/034652 | 4/2006 |
| WO | WO2006/113149 | 10/2006 |
| WO | WO 2007/082268 | 7/2007 |
| WO | WO2007/132834 | 11/2007 |
| WO | WO2008/026674 | 3/2008 |
| WO | WO2008/045847 | 4/2008 |
| WO | WO2008/059178 | 5/2008 |
| WO | WO2008/083418 | 7/2008 |
| WO | WO2010/019397 | 2/2010 |
| WO | WO2010/075319 | 7/2010 |
| WO | WO2010/088644 | 8/2010 |
| WO | WO2012/034265 | 3/2012 |
| WO | WO2013/015743 | 1/2013 |
| WO | WO2013/082545 | 6/2013 |
| WO | WO2013/134825 | 9/2013 |
| WO | WO2014/194444 | 12/2014 |
| WO | WO2015/055322 | 4/2015 |
| WO | WO2015/147758 | 10/2015 |
| WO | WO2015/186723 | 12/2015 |
| WO | WO2017/178430 | 10/2017 |
| WO | WO2018/026697 | 2/2018 |
| WO | WO2018/076057 | 5/2018 |
| WO | WO2018/208724 | 11/2018 |
| WO | WO2019/166653 | 9/2019 |
| WO | WO 2020/113212 | 6/2020 |
| WO | WO2020/138127 | 7/2020 |
| WO | WO2021/015993 | 1/2021 |

OTHER PUBLICATIONS

Cheng et al., "Effect of Bifocal and Prismatic Bifocal Spectacles on Myopia Progression in Children: Three-Year Results of a Randomized Clinical Trial," Jama Ophthalmology, Jan. 16, 2014, 132(3): 258-264.

Office Action in Japanese Appln. No. 2021-530991, dated Mar. 6, 2023, 11 pages (with English translation).

Office Action with Search Report in Great British Appln. No. 2219684.4, dated Jan. 31, 2023, 7 pages.

Office Action with Search Report in Great British Appln. No. 2219788.3, dated Jan. 31, 2023, 5 pages.

Office Action with Search Report in Great British Appln. No. 2300201.7, dated Jan. 31, 2023, 5 pages.

Office Action with Search Report in Great British Appln. No. 2300210.8, dated Jan. 31, 2023, 5 pages.

Ahern "Biochemical, reagents kits offer scientists good return on investment," The Scientist, Jul. 1995, 9(15):20.

Applied Biosystems—Product Bulletin—Automated DNA Sequencing [online] "ABI PRISM® BigDyeTM Primer Sequencing Kit," 2000, retrieved from URL <tools.thermofisher.com/content/sfs/brochures/cms_040730.pdf>, 4 pages.

Carkeet et al., "Repeatability of IOLMaster Biometry in Children, Optometry and Vision Science," Nov. 2004, 81(11) : 829-834.

Carroll et al, "Estimates of L:M cone ratio from ERG flicker photometry and genetics," Journal of Vision, 2002, 2(8):531-542.

Carroll et al., "Cone photoreceptor mosaic disruption associated with Cys203 Arg mutation in the M-cone opsin," Proceedings of the National Academy of Sciences of the United States of America, 2009, 106(49):20948-20953.

Carroll et al., "Functional photoreceptor loss revealed with adaptive optics: An alternate cause of color blindness," Proceedings of the National Academy of Sciences of the United States of America, 2004, 101(22):8461-8466.

Carroll et al., "Flicker-photometric electroretinogram estimates of L: M cone photoreceptor ratio in men with photopigment spectra derived from genetics," Journal of The Optical Society of America A, 2000, 17: 499-509.

Crognale et al., "Characterization of a novel form of X-linked incomplete achromatopsia, " Visual Neuroscience, 2004, 21(3):197-203.

Davidoff, "Cone opsin gene variants in color blindness and other vision disorders," 2015, Retrieved from URL: <https://digital.lib.washington.edu/researchworks/bitstream/handle/1773/33578/Davidoff_washington_0250E_15133.pdf?sequence=1&isAllowed=y>, 132 pages.

Drummond-Borg et al., "Molecular patterns of X chromosome-linked color vision genes among 134 men of European ancestry," Proceedings of the National Academy of Sciences of the United States of America, Feb. 1989, 86:983-987.

Gardner et al, "Three Different Cone Opsin Gene Array Mutational Mechanisms with Genotype-Phenotype Correlation and Functional Investigation of Cone Opsin Variants," Human Mutation, 2014, 35(11):1354-1362.

(56) References Cited

OTHER PUBLICATIONS

Genecards.org [online], "GeneCard for the OPN1MW gene," retrieved on Apr. 6, 2020, retrieved from URL <https://www.genecards.org/cgi-bin/carddisp.pl?gene=OPN1MW>, 27 pages.

Greenwald et al., "Role of a Dual Splicing and Amino Acid Code in Myopia, Cone Dysfunction and Cone Dystrophy Associated with L/M Opsin Interchange Mutations," Translation Vision Science & Technology, May 2017, vol. 6, No. 3, Article 2, 19 pages.

Gunther et al., "Individual differences in chromatic (red/green) contrast sensitivity are constrained by the relative number of L—versus M-cones in the eye," Vision Research, May 2002, 42(11):1367-1378.

Gwiazda et al., "A Randomized Clinical Trial of Progressive Addition Lenses versus Single Vision Lenses on the Progression of Myopia in Children," Investigative Ophthalmology & Visual Science, Apr. 2003, 44:1492-1500.

Hahner et al., "Strategies for SNP genotyping by mass spectrometry," International Congress Series, Jan. 2003. 1239: 11-16.

Halushka et al., "Patterns of single-nucleotide polymorphisms in candidate genes for blood-pressure homeostasis," Nat Genet, 1999, pp. 239-247.

Hattersley et al., "What makes a good genetic association study?" The Lancet, Oct. 2005, 366(9493):1315-1323.

Hirschhorn et al., "A comprehensive review of genetic association studies," Genet Med, 2002, pp. 45-61.

Hofer et al., "Organization of the Human Trichromatic Cone Mosaic," Journal of Neuroscience, Oct. 19, 2005, 25(42):9669-9679.

International Preliminary Report on Patentability in International Appln. No. PCT/US2019/063982, dated Jun. 10, 2021, 15 pages.

International Search Report and Written Opinion in International Appln. No. PCT/US2019/063982, dated Mar. 25, 2020, 19 pages.

Kuchenbecker et al., "Topography of the long- to middle-wavelength sensitive cone ratio in the human retina assessed with a wide-field color multifocal electroretinogram," Vis Neurosci, May-Jun. 2008, 25(3):301-306.

Lucentini, "Gene association studies typically wrong: reproducible gene-disease associations are few and far between," The Scientist, 2004, 18(24):20.

McClements et al. "Variations in Opsin Coding Sequences Cause X-Linked Cone Dysfunction Syndrome, with Myopia and Dichromacy," Investigative Ophthalmology & Visual Science, 2013, 54(2):1361-1369.

McMahon et al., "The L:M cone ratio in males of African descent with normal color vision", Journal of Vision, 2008, 8(2):1-9.

Michaelides et al., "X-Linked Cone Dysfunction Syndrome with Myopia and Protanopia," Ophthalmology, Aug. 2005, 112(8):1448-1454.

Michaelides et al., "The PROM1 mutation p.R373C causes an autosomal dominant bull's eye maculopathy associated with rod, rod-cone, and macular dystrophy," IOVS, Sep. 2010, 51(9):4771-4780.

Mizrahi-Meissonnier et al., "Variable Retinal Phenotypes Caused by Mutations in the X-Linked Photopigment Gene Array," Investigative Ophthalmology & Visual Science, Aug. 2010, (51):3884-3892.

Montana.edu [online] "Optical System Design—S15," retrieved on Jan. 7, 2019, retrieved from URL <http://www.montana.edu/jshaw/documents/18%20EELE582_S15_OTFMTF.pdf>, 18 pages.

Mummidi et al., "Evolution of Human and Non-human Primate CC Chemokine Receptor 5 Gene and mRNA, Potential Roles for Haplotype and mRNA Diversity, Differential Haplotype-Specific Transcriptional Activity, and Altered Transcription Factor Binding To Polymorphic Nucleotides in the Pathogenesis of HIV-1 and Simian Immunodeficiency VIRUS*210," Journal of Biological Chemistry, 2000, 275(25):18946-18961.

Nathans et al., "Molecular Genetics of Human Blue Cone Monochromacy," Science, Aug. 1989, 45(4920):831-838.

Nathans et al., "Molecular Genetics of Inherited Variation in Human Color Vision," Science, Apr. 1986, 232(4747):203-210.

NCBI Database GenBank Accession No. NM 020061., Nov. 1, 2009., National Center for Biotechnology Information, National Library of Medicine, Bethesda, MD, USA), 7 pages.

Neitz et al. "Variety of genotypes in males diagnosed as dichromatic on a conventional clinical anomaloscope," Visual Neuroscience, 2004, 21(3):205-216.

Neitz et al., "Cone mosaic disruption caused by L/M opsin mutations in bornholm eye disease," ARVO Annual Meeting Abstract, Apr. 2011, 2 pages.

Neitz et al., "Polymorphism in the number of genes encoding long-wavelength-sensitive cone pigments among males with normal color vision," Vision Research, Sep. 1995, 35(17):2395-2407.

Neitz, "A new mass screening test for color-vision deficiencies in children," Color Research & Application, 2001, 26(1):S239-S249.

Oda et al., "Analysis of L-cone/M-cone visual pigment gene arrays in females by long-range PCR," Vision Research, Mar. 2003, 43(5):489-495.

Office Action in Australian Appln. No. 2019387506, dated Apr. 4, 2022, 3 pages.

Okada et al., "Target Spatial Frequency Determines the Response to Conflicting Defocus—and Convergence—Driven Accommodative Stimuli," Vision Research, Feb. 2006, 46(4):475-484.

Radhakrishna et al., "The 'X-linked' severe form of myopia locus at Xq28 (MYP1): Narrowing of the critical region and exclusion of twelve known genes localized in the interval.," ARVO Annual Meeting Abstract, May 2005, 1 page.

Scholl et al., "Progressive cone dystrophy with deutan genotype and phenotype," Graefe's Archive for Clinical and Experimental Ophthalmology, 2006, 244:183-191.

Scholl et al., "Macular dystrophy with protan genotype and phenotype studied with cone type specific ERGs," Current Eye Research, 2001, 22(3):221-228.

Schwartz et al., "X-linked myopia: Bornholm Eye Disease," Clinical Genetics, 1990, 38(4):281-286.

slrlounge.com [online] "Diffraction, Aperture, and Starburst Effects," dated Feb. 2011, retrieved on Apr. 15, 2022, retrieved from URL <https://www.slrlounge.com/diffraction-aperture-and-starburst-effects>, 12 pages.

Twelker et al., "Children's Ocular Components and Age, Gender, and Ethnicity," Optometry and Vision Science, Aug. 2009, 86(8):918-935.

Ueyama et al., "Unique haplotype in exon 3 of cone opsin mRNA affects splicing of its precursor. leading to congenital color vision defect," Biochemical and Biophysical Research Communications, 2012, 424(1):152-157.

Verrelli et al., "Signatures of Selection and Gene Conversion Associated with Human Color Vision Variation," The American Journal of Human Genetics, 2004, 75(3):363-375.

Winderickx et al., "Defective colour vision associated with a missense mutation in the human green visual pigment gene," Nat Genet., 1992, pp. 251-256.

Winderickx et al., "Haplotype diversity in the human red and green opsin genes: evidence for frequent sequence exchange in exon 3," Human Molecular Genetics, 1993, 2(9):1413-1421.

Young et al., "X-Linked High Myopia Associated With Cone Dysfunction," Arch Ophthalmol., 2004, 122(6):897-908.

Young et al., "Further refinement of the MYP2 locus for autosomal dominant high myopia by linkage disequilibrium analysis," Ophthalmic Genetics, 2001, 22(2):69-75.

Office Action in Chinese Appln. No. 201980078162.8 dated Apr. 14, 2023, 16 pages (with English machine translation).

Zhang, "Spectacle Matching Technology Part 2," China Light Industry Press, Jul. 31, 2015, 6 pages (with English machine translation).

Office Action in Taiwanese Appln. No. 113121288, dated Oct. 14, 2024, 9 pages (with English translation).

Notice of Allowance in Korean Appln. No. 10-2024-7027530, dated Dec. 8, 2025, 4 pages (with English Translation).

Office Action in Chinese Appln. No. 202311255008.8, dated Nov. 8, 2025, 22 pages (with Machine Translation).

* cited by examiner

Vertical

Horizontal

Vertical

Horizontal

Vertical

Horizontal

LIGHT SCATTERING LENS FOR TREATING MYOPIA AND EYEGLASSES CONTAINING THE SAME

CROSS-REFERENCE TO RELATED APPLICATIONS

This application is a national phase entry under 35 U.S.C. 371 of PCT Application Serial PCT/US2019/063982, filed Dec. 2, 2019, which claims priority to U.S. Patent Application No. 62/773,577, filed on Nov. 30, 2018, the entire contents of which are herein incorporated by reference. The entirety of each of the foregoing is incorporated by reference.

FIELD OF THE INVENTION

The invention features ophthalmic lenses for treating myopia and reducing myopia progression.

BACKGROUND

The eye is an optical sensor in which light from external sources is focused, by a lens, onto the surface of the retina, an array of wavelength-dependent photosensors. The lens of the eye can accommodate by changing shape such that the focal length at which external light rays are optimally or near-optimally focused to produce inverted images on the surface of the retina that correspond to external images observed by the eye. The eye lens focuses light, optimally or near-optimally, emitted by, or reflected from external objects that lie within a certain range of distances from the eye, and less optimally focuses, or fails to focus objects that lie outside that range of distances.

In normal-sighted individuals, the axial length of the eye, or distance from the front of the cornea to the fovea of the retina, corresponds to a focal length for near-optimal focusing of distant objects. The eyes of normal-sighted individuals focus distant objects without nervous input to muscles which apply forces to alter the shape of the eye lens, a process referred to as "accommodation." Closer, nearby objects are focused, by normal individuals, as a result of accommodation.

Many people, however, suffer from eye-length-related disorders, such as myopia ("nearsightedness"). In myopic individuals, the axial length of the eye is longer than the axial length required to focus distant objects without accommodation. As a result, myopic individuals can view near objects at a certain distance clearly, but objects further away from that distance are blurry.

Typically, infants are born hyperopic, with eye lengths shorter than needed for optimal or near-optimal focusing of distant objects without accommodation. During normal development of the eye, referred to as "emmetropization," the axial length of the eye, relative to other dimensions of the eye, increases up to a length that provides near-optimal focusing of distant objects without accommodation. Ideally, biological processes maintain the near-optimal relative eye length to eye size (e.g., axial length) as the eye grows to final, adult size. However, in myopic individuals, the relative axial length of the eye to overall eye size continues to increase during development, past a length that provides near-optimal focusing of distant objects, leading to increasingly pronounced myopia.

It is believed that myopia is affected by environmental factors as well as genetic factors. Accordingly, myopia may be mitigated by therapeutic devices which address environmental factors. For example, therapeutic devices for treating eye-length related disorders, including myopia, are described in U.S. Pub. No. 2011/0313058A1.

SUMMARY

Various aspects of the invention are summarized as follows.

In general, in a first aspect, the invention features an ophthalmic lens, including: a lens material having two curved surfaces opposing each other; a light scattering region; a first aperture (e.g., clear or with reduced scattering density/power compared to the light scattering region) surrounded by the light scattering region; and a second aperture (e.g., clear or with reduced scattering density/power compared to the light scattering region) separated from the first clear aperture by a portion of the light scattering region.

Embodiments of the ophthalmic lens can have one or more of the following features and/or features of other aspects. For example, the ophthalmic lens can have optical power.

A separation of clear and light scattering region can be blended through a gradual change in scattering density/power.

The ophthalmic lens can be a single vision lens or a multifocal lens (e.g., a progressive lens, a freeform lens, or a bifocal lens, such as a prismatic bifocal lens). The lens can have a first optical power at the first clear aperture and a second optical power at the second clear aperture, the first and second optical powers being different. The first optical power can be selected to correct for a refractive error of a user for distance vision. The second optical power can be selected to correct for a refractive error of a user for near vision or magnify to aid in near vision work. The second optical power can be positive providing for myopic peripheral defocus in distant vision through the first clear aperture.

The first aperture can be substantially centered on a lens optical axis.

The second aperture can be displaced from a lens optical axis.

An area of the light scattering region separating the first aperture from the second aperture has different (e.g., reduced) light scattering properties compared to other areas of the light scattering region. The area of the light scattering region separating the first aperture from the second aperture defines a path of reduced scattering following the user's natural vergence between the first and second apertures.

The second aperture can be surrounded by the light scattering region.

The ophthalmic lens can include a clear area surrounding the light scattering region, wherein the second clear aperture is continuous with the clear area.

The light scattering region can include optical structures sized and arranged to reduce a contrast of an image viewed through the light scattering region compared with the first or second clear apertures.

In general, in another aspect, the invention features an ophthalmic lens that includes:

a multifocal lens having a first area having an optical power for distance vision and a second area having a different optical power for near vision; a light scattering region; a first clear region surrounded by the light scattering region, the clear region at least partially overlapping the first area of the multifocal lens; a second clear region at least partially overlapping the second area of the multifocal lens.

Embodiments of the ophthalmic lens can include one or more of the following features and/or features of other aspects. For example, the multifocal lens can be a bifocal lens (e.g., a prismatic bifocal lens), a progressive lens, or a freeform lens.

The first and second clear regions can be regions of a common aperture. The common aperture can be surrounded by the light scattering region. The common aperture can extend to an edge of the light scattering region.

The first and second clear regions can each define a discrete aperture.

In general, in another aspect, the invention features an ophthalmic lens, including: a lens material having two opposing surfaces, the surfaces being curved surfaces and defining a lens axis; a light scattering region; an aperture extending from the lens axis to a periphery of the light scattering region.

Embodiments of the ophthalmic lens can include one or more of the following features and/or features of other aspects. The aperture can be clear or have reduced scattering compared to the light scattering region.

The lens can have a region having a first optical power at the lens axis and a region having a second optical power different from the first optical power, and the clear aperture overlaps with both regions. The first optical power can be selected to correct for a refractive error of a user for distance vision. The second optical power can be selected to correct for a refractive error of a user for near vision or magnify to aid in near vision work.

The ophthalmic lens can be a progressive or freeform lens. In some embodiments, the ophthalmic lens is a bifocal lens.

In a further aspect, the invention features an ophthalmic lens including a multifocal lens having a first area having an optical power for distance vision and a second area having a different optical power for near vision, a contrast reduction region including scattering centers and/or one or more lenslets for reducing image contrast for a user of the ophthalmic lens, a first clear region surrounded by the contrast reduction region, the clear region at least partially overlapping the first area of the multifocal lens, and a second clear region at least partially overlapping the second area of the multifocal lens. Embodiments of the ophthalmic lens can include one or more of the features of other aspects.

In yet a further aspect, the invention features an ophthalmic lens including a lens material having two opposing curved surfaces, the curved surfaces defining a lens axis, a contrast reduction region for reducing image contrast for a user of the ophthalmic lens, and a clear aperture extending from the lens axis to a periphery of the defocus region. The contrast reduction region includes one or more lenslets and a plurality of scattering centers. Embodiments of the ophthalmic lens can include one or more of the features of other aspects.

In another aspect, the invention features eyeglasses including an ophthalmic lens of any of the preceding aspects.

The second aperture can be displaced from the first aperture along an axis that defines a non-zero angle, α, with a vertical axis of the eyeglass frames. The angle, α, can correspond to a path of a user's eye when a direction of the user's gaze transitions from the first clear aperture to the second clear aperture. The angle, α, can correspond to a path of a natural vergence path of the user's eyes when switching from distant vision to near vision. α can be in a range from 5° to 20°.

At least one clear aperture of the ophthalmic lens can be elongated in a vertical direction of the eyeglasses.

At least one clear aperture of the ophthalmic lens can be elongated in a horizontal direction of the eyeglasses.

At least one clear aperture elongated in the horizontal direction is located for near vision during use of the eyeglasses.

Among other advantages, disclosed embodiments include eyeglasses that can reduce eye-lengthening associated with myopia development without significantly impacting a user's vision. For example, embodiments feature lenses with a light scattering area for reducing contrast in a user's peripheral vision while including a clear aperture for distance vision and a clear aperture for near-vision tasks, such as reading. Bifocal or multifocal lenses can be used.

Other advantages will be apparent from the drawings, detailed description, and the claims.

DETAILED DESCRIPTION

Figure 1:
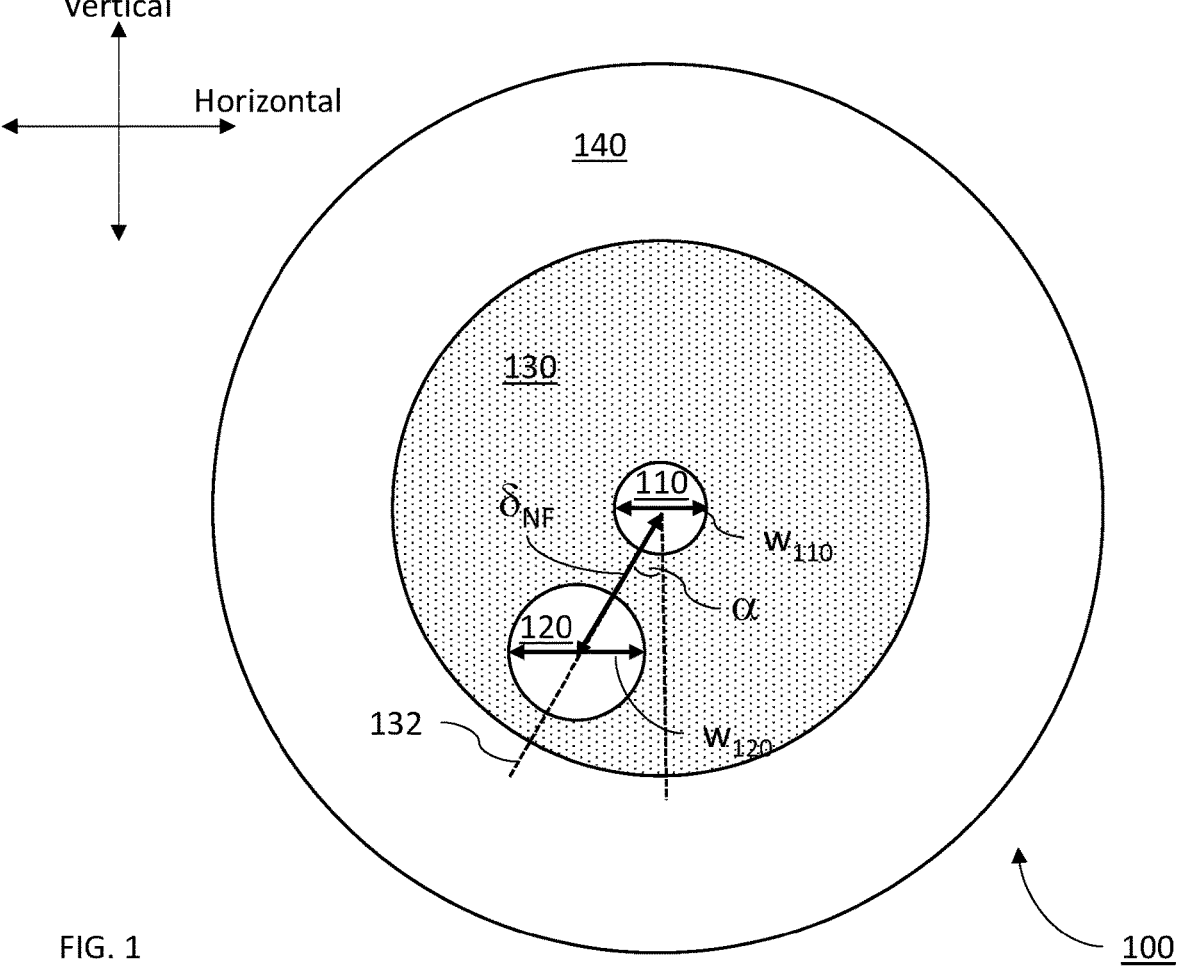
FIG. 1 is a plan view of an embodiment of an ophthalmic lens for treating myopia.

Referring to HG. 1, an ophthalmic lens 100 includes a first clear aperture 110 and an annular shaped scattering area 130 surrounding the clear aperture. In this case, the lens 100 has uniform optical properties, e.g., is a single vision lens, such as a spherical lens or a compound or toric lens (i.e., having a spherical component and a cylindrical component), or a plano lens i.e., a lens with no optical power). FIG. 1 also shows a vertical and horizontal axis for ease of reference. While lens 100 is depicted as a circular blank, and therefore rotationally symmetric for a spherical lens, it will be understood that the horizontal and vertical directions refer to how the lens will be oriented when mounted in glasses frames.

First clear aperture 110 is positioned substantially near the center of lens 100. Scattering area 130 is also centered with respect to the lens center. Scattering area 130 is also surrounded by a clear area 140. A second clear aperture 120 is also provided in light scattering area 130, separated from clear aperture 110 along an axis 132 that is offset by an angle $\alpha$ from the vertical axis of the lens.

The horizontal and vertical axes refer to how lens 100 is ultimately oriented in a pair of eyeglass frames. In an unmounted spectacle lens 100 prior to shaping for mounting in a frame, where the lens is plano or spherical, such lenses are generally radially symmetric and the angle $\alpha$ is arbitrary until the lens is shaped for mounting. However, in lenses which do not possess rotational symmetry, such as toric lenses, the angle $\alpha$ can alternatively can be defined relative to the orientation of the second aperture 120 compared to the axis of the cylindrical component. Of course, where the cylinder axis is parallel to the vertical axis, a will be the same regardless of how it is defined.

In the embodiment show in FIG. 1, clear aperture 110 is a distance vision aperture, which can be engaged for distance-vision activities such as reading road signs. The second clear aperture 120 is a near vision aperture, which can be engaged for near-vision activities, such as reading a book.

In general, a can vary. When compared to an axis of cylindrical power, the offset angle $\alpha$ can vary between 0 and 180 degrees.

When $\alpha$ refers to the offset angle from the vertical meridian once mounted, it can be selected to accommodate the path of the user's eye when they focus on near objects. When a person accommodates to focus on near objects, this also creates convergence, or the movement of the eyes inward in the horizontal direction, called vergence. Therefore, in order to make near-vision objects visible to the accommodated eye through the second aperture, the angle can be chosen to match a user's vergence for near objects. In some embodiments, $\alpha$ is 45° or less, e.g., about 30° or less, about 25° or less, about 20° or less, about 15° or less, about 10° or less, about 8° or less, e.g., 1° or more, 2° or more, 3° or more, 4° or more, 5° or more, or 0°. For example, the clear aperture 120—for near-vision—can be offset from the vertical axis that passes through the center of clear aperture 110 toward the user's nose in order to accommodate for vergence of the wearer's eyes as they focus on near objects. This offset can be 1 mm or more (e.g., 2 mm or more, 3 mm or more, 4 mm or more, 5 mm or more, 6 mm or more, 7 mm or more, such as 10 mm or less, 9 mm or less, 8 mm or less), where the distance is measured from the central point in the horizontal direction of clear aperture 120 from the central point in the horizontal direction of clear aperture 110 (which may correspond to the center of the lens, in some embodiments). Both clear aperture 110 and clear aperture 120 are circular in shape, with aperture 120 having a slightly larger diameter than aperture 110. Generally, the size of the apertures can vary and are set so that they provide the user with adequate on-axis vision (through aperture 110) and adequate near-vision (through aperture 120) while not being so large as to significantly impede the effect of the contrast reduction in peripheral vision due to the scattering area. Typically, both clear apertures have diameters of 2 mm or more (e.g., 3 mm or more, 4 mm or more, 5 mm or more, such as 10 mm or less).

Non-circular apertures are also possible (see below for specific examples). For instance, the horizontal width of an aperture can be different from a vertical height of the apertures. In FIG. 1, the horizontal widths of apertures 110 and 120 are designated $w_{110}$ and $w_{120}$, respectively. Generally, the horizontal widths of the apertures can be the same or different. In some embodiments, such as illustrated in FIG. 1, $W_{120}$ can be larger than $w_{110}$. For example, $w_{120}$ can be 10% or more larger than $w_{110}$ (e.g., 20% or more, 30% or more, 40% or more, 50% or more, 75% or more, 100% or more, such as 200% or less, 150% or less, 120% or less). In some embodiments, the win is selected so that, for near vision, the user's visual axis stays within the clear aperture 120 while the user is engaged with a specific task during which their eye horizontally scans a visual field (e.g., while reading). This can be advantageous where it allows the user to scan the visual field through the clear aperture without having to move their head.

The distance between the apertures can also vary and is typically set so that the apertures correspond to comfortable on-axis vision and comfortable near-vision for the user. The distance between the closest edges of the clear apertures can be 1 mm or more (e.g., 2 mm or more, 5 mm or more, such as 10 mm or less).

A distance between the centers of aperture 110 and aperture 120, denoted $\delta_{NF}$ in FIG. 1, can vary so that aperture 120 corresponds to gaze direction of the user when focused on near objects. In some embodiments, $\delta_{NF}$ can be in a range from 0.5 mm to 20 mm (e.g., 0.6 mm or more, 0.7 mm or more, 0.8 mm or more, 0.9 mm or more, 10 mm or more, 11 mm or more, 12 mm or more, 13 mm or more, 14 mm or more, e.g., 19 mm or less, 18 mm or less, 17 mm or less, 16 mm or less, 15 mm or less).

The separation between aperture 110 and aperture 120 depends on the size of each aperture and the distance between their centers. In some embodiments, this separation can be 0.5 mm or more (e.g., 1 mm or more, 2 mm or more, 3 mm or more). The separation can be less than 10 mm (e.g., 9 mm or less, 8 mm or less, 7 mm or less, 6 mm or less, 5 mm or less).

Light scattering area 130 includes scattering centers which scatter at least some of the light incident on the lens in these areas. This can reduce contrast of the peripheral vision of a user, which is believed to reduce development of myopia in a user. Generally, scattering centers can include features (e.g., protrusions or depressions) on a surface in the lens or inclusions in the bulk lens material. Patterns of scattering centers suitable for the light scattering area are described, for example, in PCT Application WO 2018/026697, entitled "OPHTHALMIC LENSES FOR TREATING MYOPIA," filed on Jul. 31, 2017, in Provisional Application No. 62/671,992, entitled "OPHTHALMIC LENSES WITH LIGHT SCATTERING FOR TREATING MYOPIA," filed May 15, 2018, and in U.S. Patent Publication No. US-2019-0235279-A1, entitled "OPHTHALMIC LENSES WITH LIGHT SCATTERING FOR TREATING MYOPIA," published on Aug. 1, 2019. The contents of each of these applications are incorporated herein by reference in their entirety.

In general, the nature of the scattering centers can be selected based on a variety of design parameters to provide a desired degree of light scattering on the user's retina. Generally, these design parameters include the scattering center density, their size and shape, and their refractive index, for example, and are discussed in more detail below. Ideally, the scattering centers are selected to provide high visual acuity on the fovea and reduced image contrast on other parts of the retina with sufficiently low discomfort to the wearer to allow for extended, continuous wear. For instance, it can be desirable for children to be comfortable wearing the eyeglasses for most, if not all, of a day. Alternatively, or additionally, scattering centers can be designed for specific tasks, especially tasks which are believed to strongly promote eyelength growth, e.g., video gaming, reading or other wide angle, high contrast image exposure. For example, in such situations (e.g., where the user experiences high contrast in their peripheral vision and/or situations that do not require the wearer to move and to orient themselves using peripheral vision), the scattering intensity and scatter angle in the periphery can be increased, while considerations of consciousness and self-esteem may be less of a concern. This can lead to a higher efficiency in peripheral contrast reduction in such high contrast environment.

It is believed that reduced image contrast on the fovea of the user's eye is less efficient at controlling eye growth than reducing image contrast on other parts of the user's retina. Accordingly, the scattering centers can be tailored to reduce (e.g., minimize) light scattered into the user's fovea, while relatively more of the light on other parts of the retina is scattered light. The amount of scattered light on the fovea can be affected by the size of the clear apertures, but also by the nature of the scattering centers, especially those closest to the clear apertures. In some embodiments, for example, the scattering centers closest to the clear apertures can be designed for less efficient light scattering than those further away. Alternatively, or additionally, in some embodiments scattering centers closest to the clear apertures can be designed for smaller angle forward scattering that those further from the aperture.

In certain embodiments, scattering centers can be designed to deliver reduced narrow angle scattering and increased wide angle scattering through geometry of scattering centers to create even light distribution on retina/low contrast signal, while preserving visual acuity. For example, the scattering centers can be designed to generate significant wide forward angle scattering (e.g., such as more than 10%, 20% or more, 30% or more, 40% or more, 50% or more, deflected by more than 2.5 deg.). Narrow angle forward scattering, i.e., within 2.5 deg., can be kept relatively low (e.g., 50% or less, 40% or less, 30% or less, 20% or less, 10% or less).

In general, a variety of different metrics can be used to evaluate the performance of scattering centers in order to optimize them for use in myopia reducing eye-glasses. For example, scattering centers can be optimized empirically, e.g., based on physical measurements of lenses with different scattering centers shapes, sizes, and layouts. For example, light scattering can be characterized based on haze measurements, such as international test standards for haze (e.g., ASTM D1003 and BS EN ISO 13468). Conventional hazemeters can be used, e.g., a BYK-Gardner haze meter (such as the Haze-Gard Plus instrument) that measures how much light is totally transmitted through a lens, the amount of light transmitted undisturbed (e.g., within 0.5 deg.), how much is deflected more than 2.5 deg., and clarity (amount within 2.5 deg.), which can be considered a measure for narrow angle scattering. Other equipment can also be used to characterize light scattering for purposes of empirically optimizing scattering patterns. For example, equipment that measures light diffusion by measuring light in annular ring around 2.5 deg. can be used (e.g., equipment from Hornell described in standard EN 167).

Alternatively, or additionally, scattering centers can be optimized by computer modelling software (e.g., Zemax or Code V).

In some embodiments, scattering centers can be designed based on optimization of a point spread function, which is a representation of an image of the scattering center on the retina. For example, the size, shape, composition, spacing and/or refractive index of the scattering centers can be varied to evenly spread illumination of retina such that the retina outside of fovea is homogeneously blanketed with scattered light to reduce (e.g., minimize) contrast at this region of the retina.

In some embodiments, the optimization of light scattering blanketing the peripheral retina accentuates the intensity of scattered light vs. undisturbed light in certain areas of the retina to more strongly suppress high contrast images. High contrast images, e.g., reading black and white text, tend to stem more from the lower half of the visual orbit. Therefore, a stronger blanketing of the upper retinal orbit with scattered light can be beneficial to reduce the signal for axial length growth, while reducing the visual impact, e.g., glare or halos, on the upper visual orbit.

Alternatively, or additionally, scattering centers can be designed based on optimization of a modulation transfer function, which refers to the spatial frequency response of the human visual system. For instance, the size, shape, and spacing of the scattering centers can be varied to smoothen attenuation of a range of spatial frequencies. Design parameters of the scattering centers can be varied in order to increase or decrease certain spatial frequencies as desired. Generally, the spatial frequencies of interest for vision are 18 cycles per deg. on the fine side, and 1.5 cycles per deg. on the course side. Scattering centers can be designed to provide increased signal at certain subsets of spatial frequencies within this range.

The aforementioned metrics can be used to evaluate scattering centers based on the size and/or shape of the scattering centers, both of which can be varied as desired. For example, the scattering centers can be substantially round (e.g., spherical), elongate (e.g., ellipsoidal), or irregularly-shaped. Generally, where scattering centers are protuberances on a surface of the lens, the protuberances should have a dimension (e.g., diameter) that is sufficient large to scatter visible light, yet sufficiently small so as not to be resolved by the wearer during normal use. For example, the scattering centers can have a dimension in a range from about 0.001 mm or more (e.g., about 0.005 mm or more, about 0.01 mm or more, about 0.015 mm or more, about 0.02 mm or more, about 0.025 mm or more, about 0.03 mm or more, about 0.035 mm or more, about 0.04 mm or more, about 0.045 mm or more, about 0.05 mm or more, about 0.055 mm or more, about 0.06 mm or more, about 0.07 mm or more, about 0.08 mm or more, about 0.09 mm or more, about 0.1 mm) to about 1 mm or less (e.g., about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm).

Note that for smaller scattering centers, e.g., having a dimension that is comparable to the wavelength of light (e.g., 0.001 mm to about 0.05 mm), the light scattering may be considered Raleigh or Mie scattering. For larger scattering centers, e.g., about 0.1 mm or more, light scattering may be mostly due to geometric scattering.

In general, the dimension of the scattering centers may be the same across each lens or may vary. For example, the dimension may increase or decrease as a function of the location of the scattering center, e.g., as measured from the clear aperture and/or as a function of distance from an edge of the lens. In some embodiments, the scattering center dimensions vary monotonically as the distance from the center of the lens increases (e.g., monotonically increase or monotonically decrease). In some cases, monotonic increase/decrease in dimension includes varying the diameter of the scattering centers linearly as a function of the distance from the center of the lens.

The shape of scattering centers can be selected to provide an appropriate light scattering profile. For example, the scattering centers can be substantially spherical or aspherical. In some embodiments, scattering centers can be elongated in one direction (e.g., in the horizonal or vertical direction), such as in the case of elliptical centers. In some embodiments, the centers are irregular in shape.

Generally, the distribution of scattering centers in scattering area 130 can vary to provide an appropriate level of light scattering. In some embodiments, scattering centers are arranged in a regular array, e.g., on a square grid, spaced apart by a uniform amount in each direction. In general, the scattering centers are spaced so that, collectively, they provide sufficient contrast reduction in the viewer's periphery for myopia reduction. Typically, smaller spacing between scattering centers will result in greater contrast reduction (provided adjacent scattering centers do not overlap or merge). In general, scattering centers can be spaced from their nearest neighbor by an amount in a range from about 0.05 mm (e.g., about 0.1 mm or more, about 0.15 mm or more, about 0.2 mm or more, about 0.25 mm or more, about 0.3 mm or more, about 0.35 mm or more, about 0.4 mm or more, about 0.45 mm or more, about 0.5 mm or more, about 0.55 mm or more, about 0.6 mm or more, about 0.65 mm or more, about 0.7 mm or more, about 0.75 mm or more) to about 2 mm (e.g., about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1 mm or less, about 0.9 mm or less, about 0.8 mm or less). As an example, spacing can be 0.55 mm, 0.365 mm, or 0.240 mm.

Scattering centers may be arrayed in grids that are not square. For example, hexagonal (e.g., hexagonally close packed) grids may be used. Non-regular arrays are also possible, e.g., random or semi-random placement may be used.

In general, the coverage of a lens by scattering centers can vary as desired. Here, coverage refers to the proportion of the lens's total area, as projected onto the plane shown in FIG. 1 that corresponds to a scattering center. Typically, a lower scattering center coverage will yield lower scattering than higher coverage (assuming individual scattering centers are discrete, i.e., they do not merge to form larger scattering centers). Scattering center coverage can vary from 5% or more to about 75%. For example, coverage can be 10% or more, 15% or more, 20% or more, 25% or more, 30% or more, 35% of more, 40% or more, 45% or more, such as 50% or 55%). Coverage can be selected according to a comfort level of a user, e.g., to provide a level of peripheral vision sufficiently comfortable that the wearer will voluntarily wear the eyeglasses for extended periods (e.g., all day) and/or according to the desired intensity with which the axial eye length growth signal is suppressed.

It is believed that light from a scene that is incident on the lens in scattering area 130 between the scattering centers contributes to a recognizable image of the scene on the user's retina, while light from the scene incident on the scattering centers does not. Moreover, at least some of the light incident on the scattering centers is transmitted to the retina, so has the effect of reducing image contrast without substantially reducing light intensity at the retina. Accordingly, it is believed that the amount of contrast reduction in the user's peripheral field of view is correlated to (e.g., is approximately proportional to) the proportion of the surface area of the reduced-contrast areas covered by the scattering centers.

In general, the scattering centers are intended to reduce the contrast of images of objects in the wearer's peripheral vision without significantly degrading the viewer's visual acuity in this region. For example, the scattering centers can be scatter predominantly into wide angles. Here, peripheral vision refers to the field of vision outside of the field of the clear aperture. Image contrast in these regions can be reduced by 40% or more (e.g., 45% or more, 50% or more, 60% or more, 70% or, more, 80% or more) relative to an image contrast viewed using the clear aperture of the lens as determined. Contrast reduction may be set according to the needs of each individual case. It is believed that a typical contrast reduction would be in a range from about 50% to Contrast reductions of lower than 50% may be used for very mild cases, while subjects who are more predisposed might need a higher than 55% contrast reduction. Peripheral visual acuity can be corrected to 20/30 or better (e.g., 20/25 or better, 20/20 or better) as determined by subjective refraction, while still achieving meaningful contrast reduction. In embodiments, contrast reduction can result in loss of two or fewer Stellen chart lines 1.5 or fewer lines, one line or less), where one line of loss corresponds to a visual acuity drop from 20/20 to 20/25.

Contrast, here, refers to the difference in luminance between two objects within the same field of view. Accordingly, contrast reduction refers to a change in this difference.

Contrast and contrast reduction may be measured in a variety of ways. In some embodiments, contrast can be measured based on a brightness difference between different portions of a standard pattern, such as a checkerboard of black and white squares, obtained through the clear aperture and scattering center pattern of the lens under controlled conditions.

Alternatively, or additionally, contrast reduction may be determined based on the optical transfer function (OTF) of the lens (see, e.g., http://www.montana.edu/jshaw/documents/18%20EELE582_S15_OTFMTF.pdf). For an OTF, contrast is specified for transmission of stimuli in which light and dark regions are sinusoidally modulated at different "spatial frequencies." These stimuli look like alternating light and dark bars with the spacing between bars varying over a range. For all optical systems the transmission of contrast is lowest for the sinusoidally varying stimuli having the highest spatial frequencies. The relationship describing the transmission of contrast for all spatial frequencies is the OTF. The OTF can be obtained by taking the Fourier transform of the point spread function. The point spread function can be obtained by imaging a point source of light through the lens on to a detector array and determining how light from a point is distributed across the detector.

In the event of conflicting measurements, the OTF is technique is preferred. In some embodiments, contrast may be estimated based on the ratio of the area of the lens covered by scattering centers compared to the area of the clear apertures. In this approximation, it is assumed that all the light that hits the scattering centers becomes uniformly dispersed across the entire retinal area, which reduce the amount of light available in lighter areas of an image and this adds light to darker areas. Accordingly, contrast reduction may be calculated based on light transmission measurements made through the clear apertures and scattering area of a lens.

Light scattering area 130 has a circular shape, although other shapes are also possible (e.g., elliptical, polygonal, or other shape). The size of light scattering area is typically selected so that reduced contrast of the user's peripheral vision is experienced over a substantial part of the user's visual field, even when not looking directly through the on-axis aperture. Light scattering area 130 can have a diameter (or maximum dimension, for non-circular areas) of 30 mm or more (e.g., 40 mm or more, 50 mm or more, 60 mm or more, 70 trim or more, 80 mm or more e.g., 100 mm or less, 90 mm or less, 80 mm or less, 70 mm or less, 60 mm or less). In some embodiments, the light scattering area extends to the edge of the lens.

In some embodiments the periphery of the light scattering area can be blended with the clear area by gradually reducing the light scattering amount, density or power.

In some embodiments the clear area can exhibit a lower amount of light scattering compared to the light scattering area.

Figure 2A:
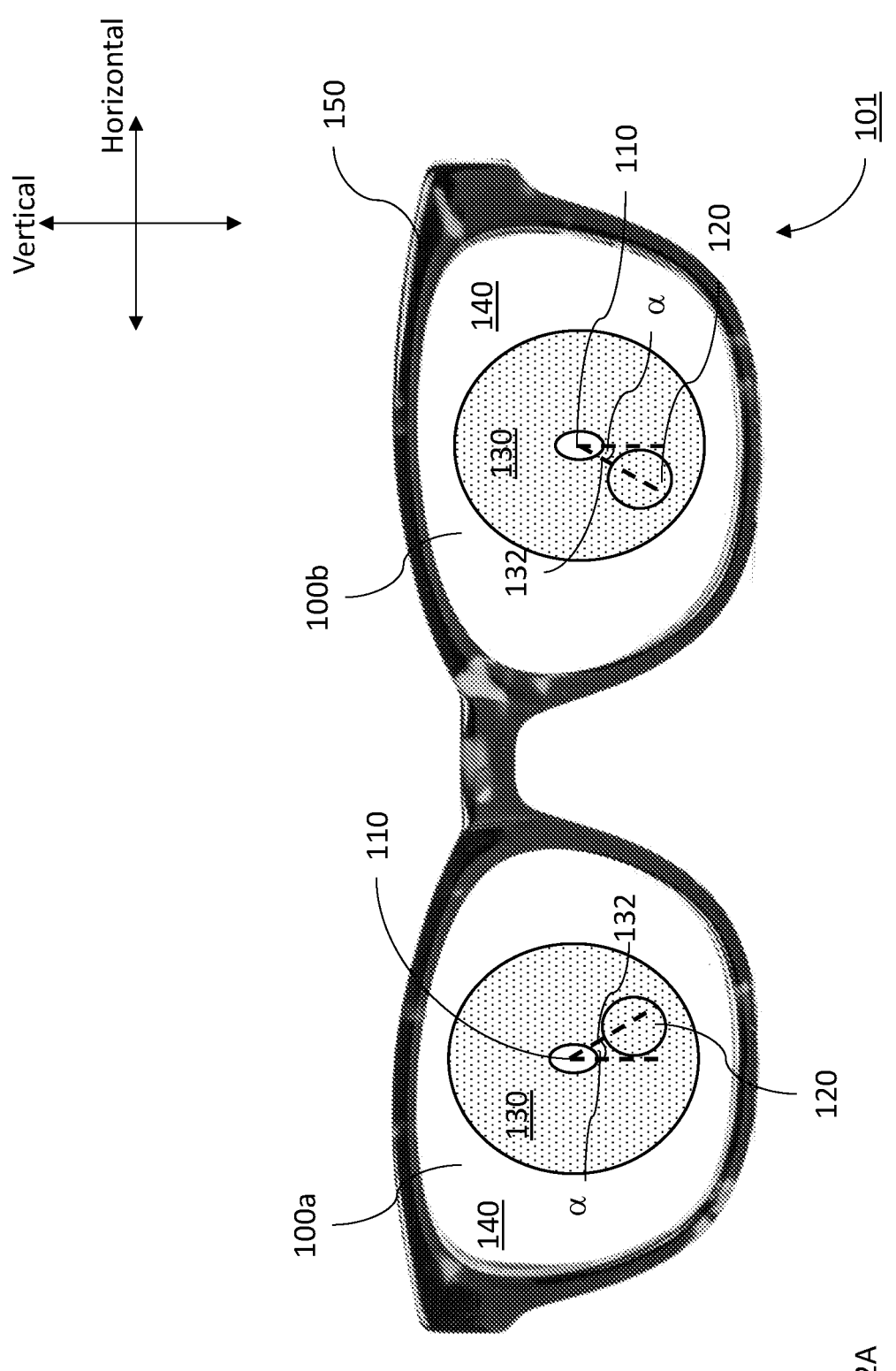
FIG. 2A is a diagram of a pair of eyeglasses containing the ophthalmic lenses as shown in FIG. 1.

Referring to FIG. 2A, eyeglasses 101 include two lenses 100a and 100b in eyeglass frames 150. Each lens corresponds to lens 100 shown in FIG. 1, shaped and sized to fit frames 150 with the second clear aperture 120 aligned below clear aperture 110 along the axis 132, an angle α from the vertical axis. In each case, the offset angle α is in the direction of the user's nose. While this angle is the same in lenses 100a and 100b, in some embodiments, the offset angle can be different. For example, different offset angles can be used to accommodate variations between the vergence for each eye.

Figures 2B, 2C:
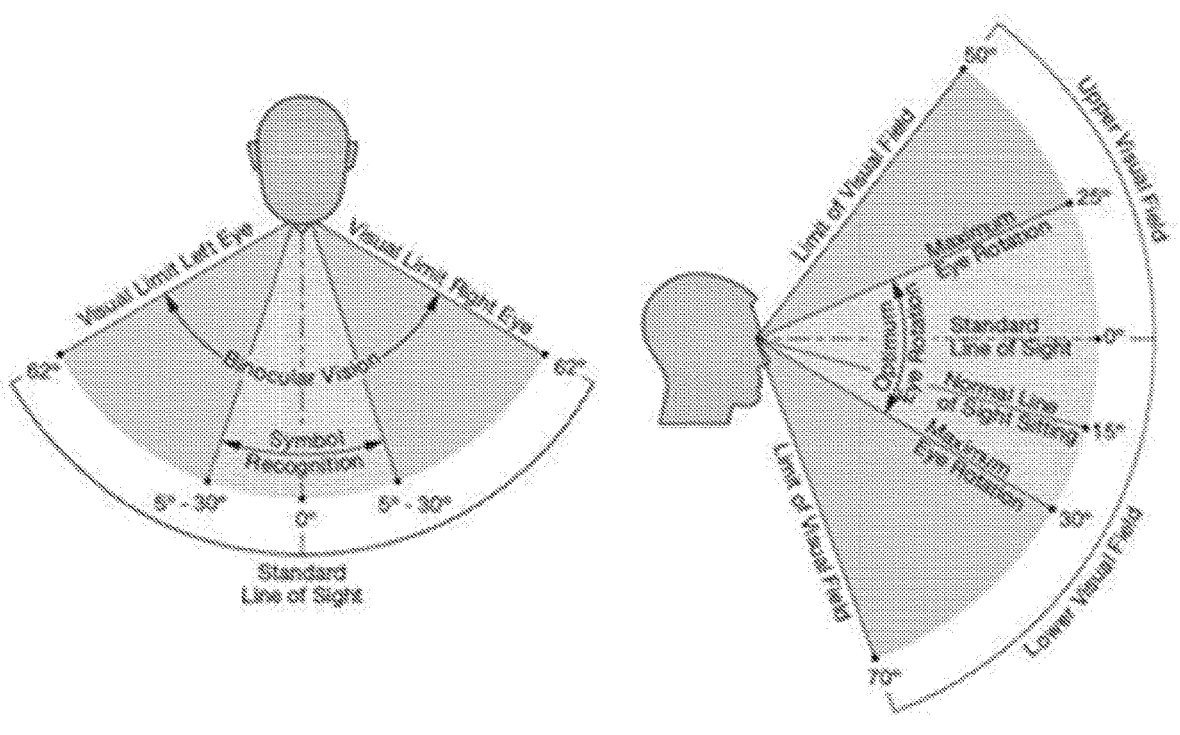
FIG. 2B shows the horizontal field of view of a typical person.
FIG. 2C shows the vertical field of view of a typical person.

Referring to FIGS. 2B and 2C, clear apertures 110 and 120 can be sized, shaped, and positioned in eyeglasses 101 to provide a line of sight through aperture 110 along the Standard Line of Sight of a user (e.g., for distance vision) and to provide a line of sight through aperture 120 along the Normal Line of Sight Sitting (e.g., for near vision, such as for reading). Clear aperture 110 can be sized and positioned to provide a line of sight through the clear aperture for ±2° or more (e.g., ±3° or more, ±4° or more, ±5° or more, such as ±10° or less, ±9° or less, ±8° or less, ±7° or less, ±6° or less) the vertical and/or horizontal directions. The angular range in the horizontal and vertical directions can be the same or different. The angular range in the upper visual field can be the same or different as the angular range in the lower visual field.

Clear aperture 120 can be sized and positioned to provide a line of sight through the clear aperture for ±2° or more (e.g., ±3° or more, ±4° or more, ±5° or more, such as ±10° or less, ±9° or less, ±8° or less, ±7° or less, ±6° or less) in the vertical and/or horizontal directions about the Normal Line of Sight Sitting axis. The angular range in the horizontal and vertical directions can be the same or different. In some embodiments, clear aperture 120 can have a horizontal width sufficient so that the user has a line of sight through the aperture in the Symbol Recognition region, e.g., at 15° below the Standard. Line of Sight. For example, the horizontal width of clear aperture 120 can be sized to provide a line of sight through the clear aperture for up to ±30° (e.g., up to ±25°, up to ±20°, up to ±15°, up to ±12°.

While ophthalmic lens 100 features a circular distance vision aperture and a circular near vision aperture, more generally, one or both of these apertures can be have non-circular shapes, e.g., to provide desired field of view side along the Standard Line of Sight axis and the Normal Line of Sight Sitting axis. For example, either or both clear apertures can be elliptical, polygonal, or have irregular shapes.

Figure 3:
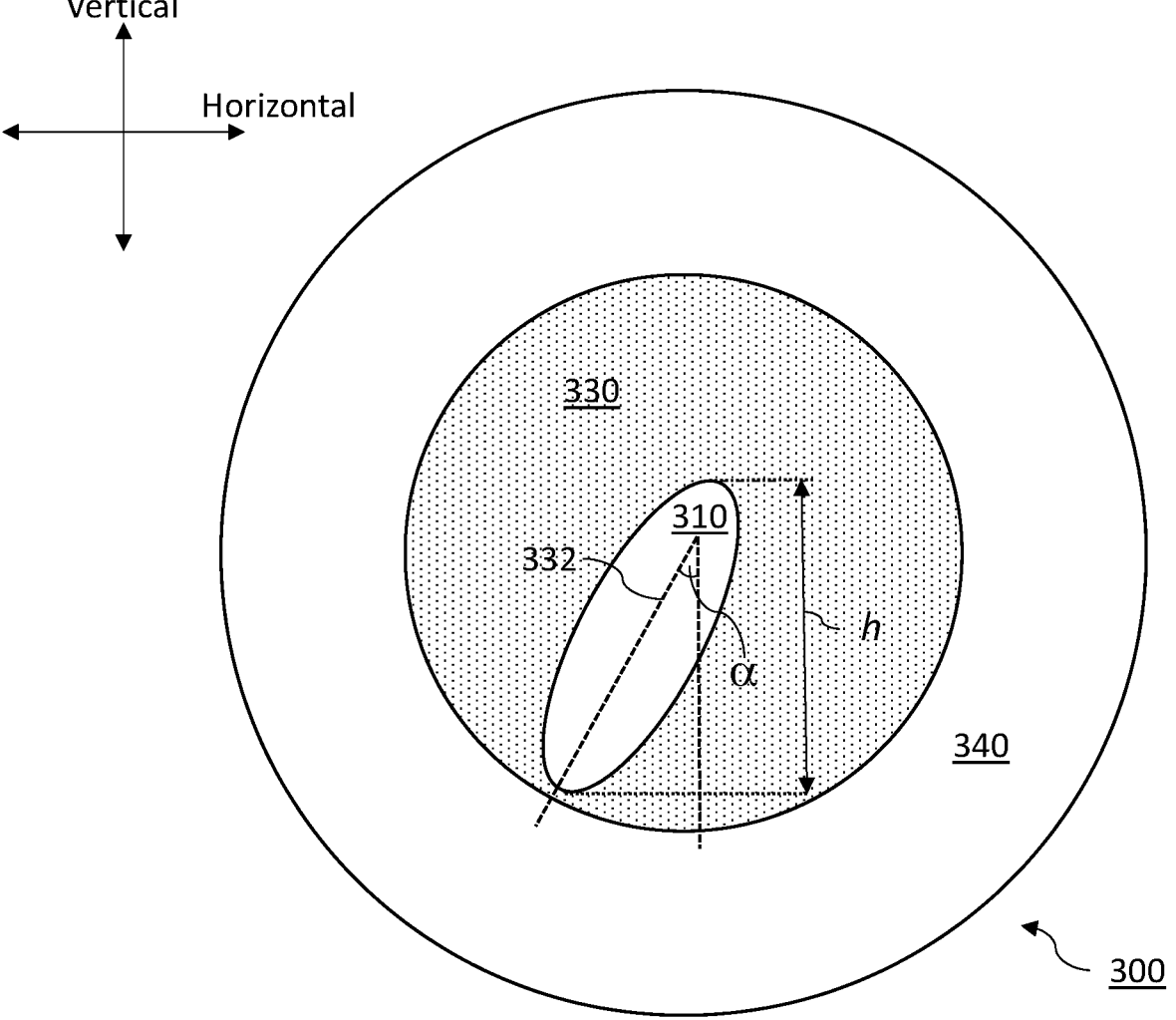
FIG. 3 is a plan view of another embodiment of an ophthalmic lens for treating myopia.

In some embodiments, an ophthalmic lens can include a single elongated aperture that extends from a distance vision region of the lens to the near vision region. For example, referring to FIG. 3, an ophthalmic lens 300 includes a clear elliptical aperture 310 and a circular light scattering area 330 surrounding the clear aperture 310. The circular light scattering area 330 is also substantially centered with respect to the lens center. Scattering area 330 is also surrounded by clear area 340.

Clear aperture 310 is an elliptical aperture with one end positioned near the center of the lens, and extends radially out within the circular light scattering area 330 towards clear area 340. Thus, the aperture extends from the distance-vision area near the center of the lens, to the near-vision area of the lens near the edge of the circular light scattering area 330. The major axis of the elliptical aperture extends out along an axis 332 that is offset by an angle, α, from the vertical axis of the lens. In general, a can vary. In some embodiments, α is 45° or less, e.g., about 30° or less, about 25° or less, about 20° or less, about 15° or less, about 10° or less, about 8° or less, e.g., 1° or more, 2° or more, 3° or more, 4° or more, 5° or more, or 0°. Generally, the offset angle can be selected to accommodate the path of the user's eye when they focus on near objects. Generally, the offset angle can be selected to accommodate the path of the user's eye when they focus on near objects.

While clear aperture 310 is elliptical in shape, other shapes are possible (e.g., polygonal or any other shape, such as a dipole or peanut shape). Generally, the size of the apertures can vary and are set so that they provide the user with adequate on-axis vision (through the first end of aperture 310) and adequate near-vision (through the second end of aperture 320). The apertures should not be so large as to significantly impede the effect of the contrast reduction in peripheral vision due to the scattering area in far, near or intermediate vision scenarios.

Aperture 310 has a height, h, along the vertical direction. In general, h can be chosen so that the aperture spans the distance vision area to a near vision area. In some embodiments, h can be sufficiently large to accommodate variations in placement of eyeglasses, e.g., through rotation of the eyeglasses about the wearer's nose bridge or where the eyeglasses slide down the wearer's nose. In other words, the aperture has a height sufficient so that the wearer still sees through clear aperture 310 in instances where the position or orientation of the eyeglasses shift on the wearer during normal use. Generally, h can be in a range from 10 mm to 25 mm (e.g., 12 mm or more, 15 mm or more, 18 mm or more, e.g., 22 mm or less, 20 mm or less).

Figure 4:
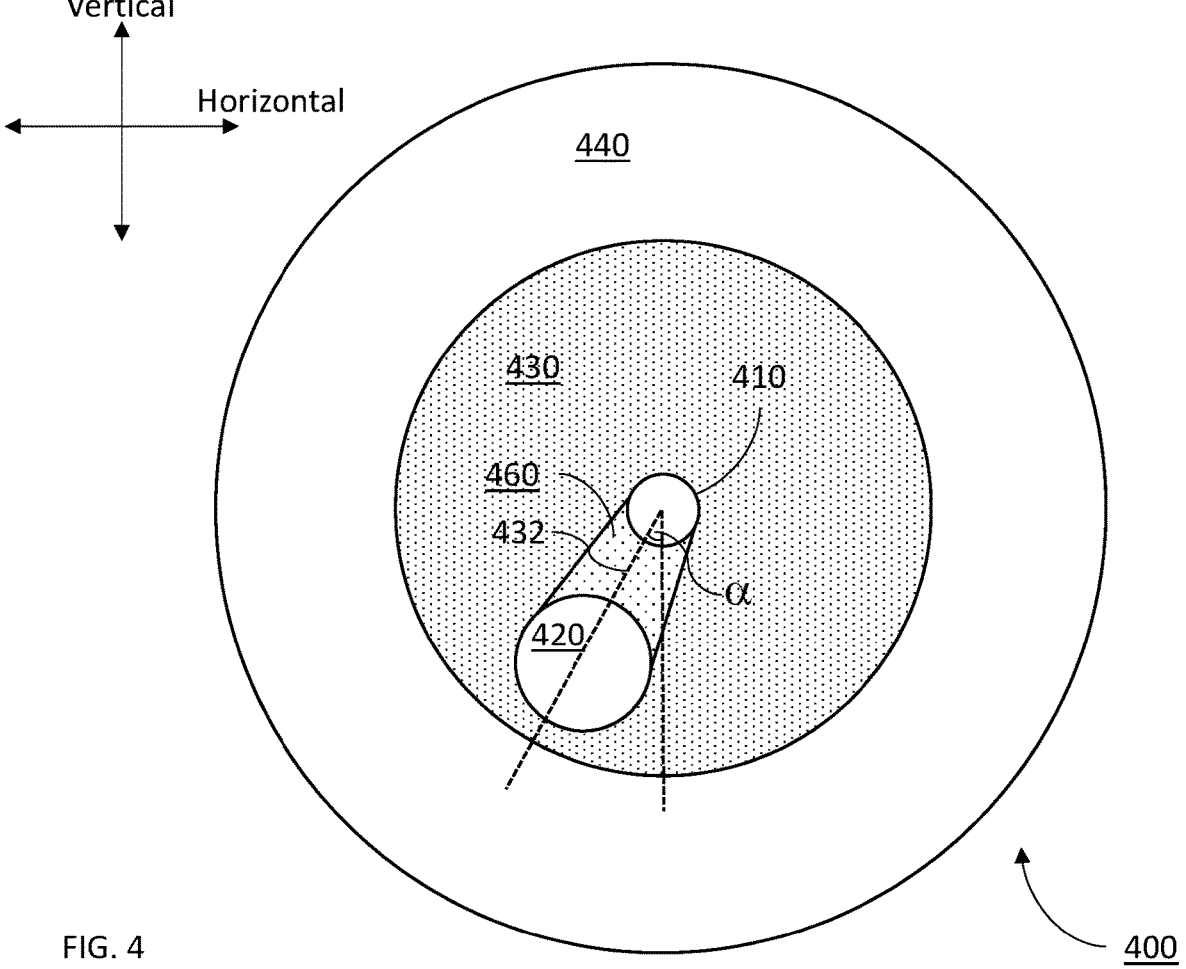
FIG. 4 is a plan view of a further embodiment of an ophthalmic lens for treating myopia.

In another example, referring to FIG. 4, an ophthalmic lens 400 includes a first clear aperture 410 and a circular light scattering area 430 surrounding the first clear aperture 410. First clear aperture 410 is positioned substantially near the center of lens 400. Scattering area 430 is also substantially centered with respect to the lens center. Scattering area 430 is also surrounded by a clear area 440.

A second clear aperture 420 is also provided in the circular light scattering area 430. Second clear aperture 420 is circular, and is aligned along an axis 432 that is offset by angle, α, from the vertical axis of the lens.

The lens 400 also includes a transition area 460 that has different scattering properties than the scattering area 430 for reducing contrast in a user's peripheral vision. For example, transition area 460 can have reduced scattering compared to scattering area 430 (e.g., by a lower density of scattering centers, a different size of scattering, while still providing some contrast reduction for peripheral vision when the user is engaged in viewing through either clear aperture 410 or clear aperture 420. Transition area 460 can coincide with the natural vergence path of the user's eye when transitioning from distance vision to near vision.

Both clear aperture 410 and clear aperture 420 are circular in shape, with aperture 420 having a slightly larger diameter than aperture 410. In some embodiments, the second aperture could have the same size diameter, or a smaller diameter, than the first aperture. More generally, other shapes are possible (e.g., polygonal or any other shape) and the size of the apertures can vary and are set so that they provide the user with adequate on-axis vision (through aperture 410) and adequate near-vision (through aperture 420) as described previously.

Figure 5:
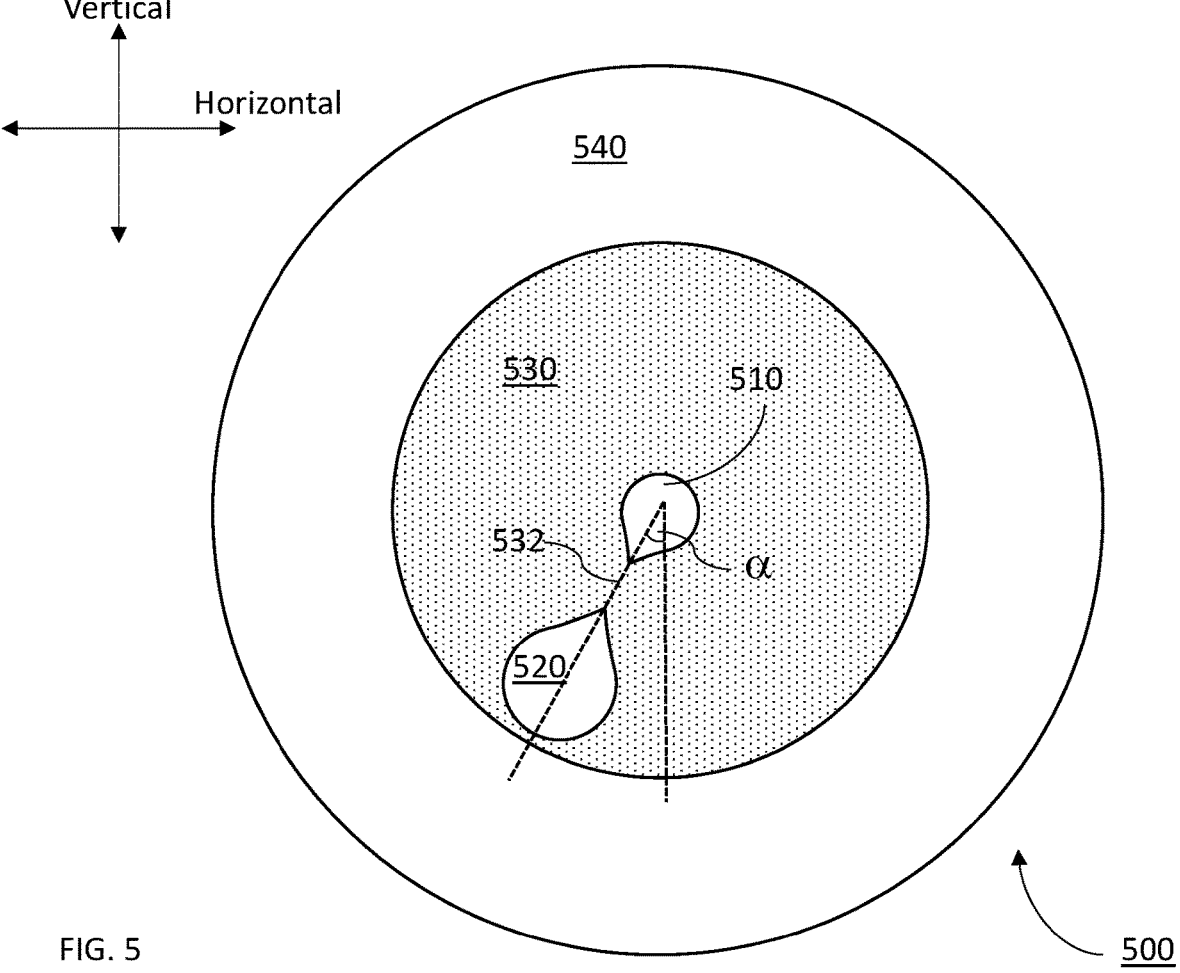
FIG. 5 is a plan view of yet another embodiment of an ophthalmic lens for treating myopia.

As noted previously, the shape of the clear apertures can vary. Referring to FIG. 5, an ophthalmic lens 500 includes a first clear tear-drop shaped aperture 510 and a circular light scattering area 530 surrounding the first clear aperture 510. First clear aperture 510 is positioned substantially near the center of lens 500. Scattering area 530 is also substantially centered with respect to the lens center. Scattering area 530 is also surrounded by a clear area 540.

A second tear-drop shaped clear aperture 520 is also provided in the circular light scattering area 530. Second clear aperture 530 is aligned along an axis 532 that is offset by an angle, α, from the vertical axis of the lens. Clear aperture 510 is a distance vision aperture, which can be engaged for distance-vision activities such as reading road signs. The second clear aperture 520 is a near vision aperture, which can be engaged for near-vision activities.

Figure 6:
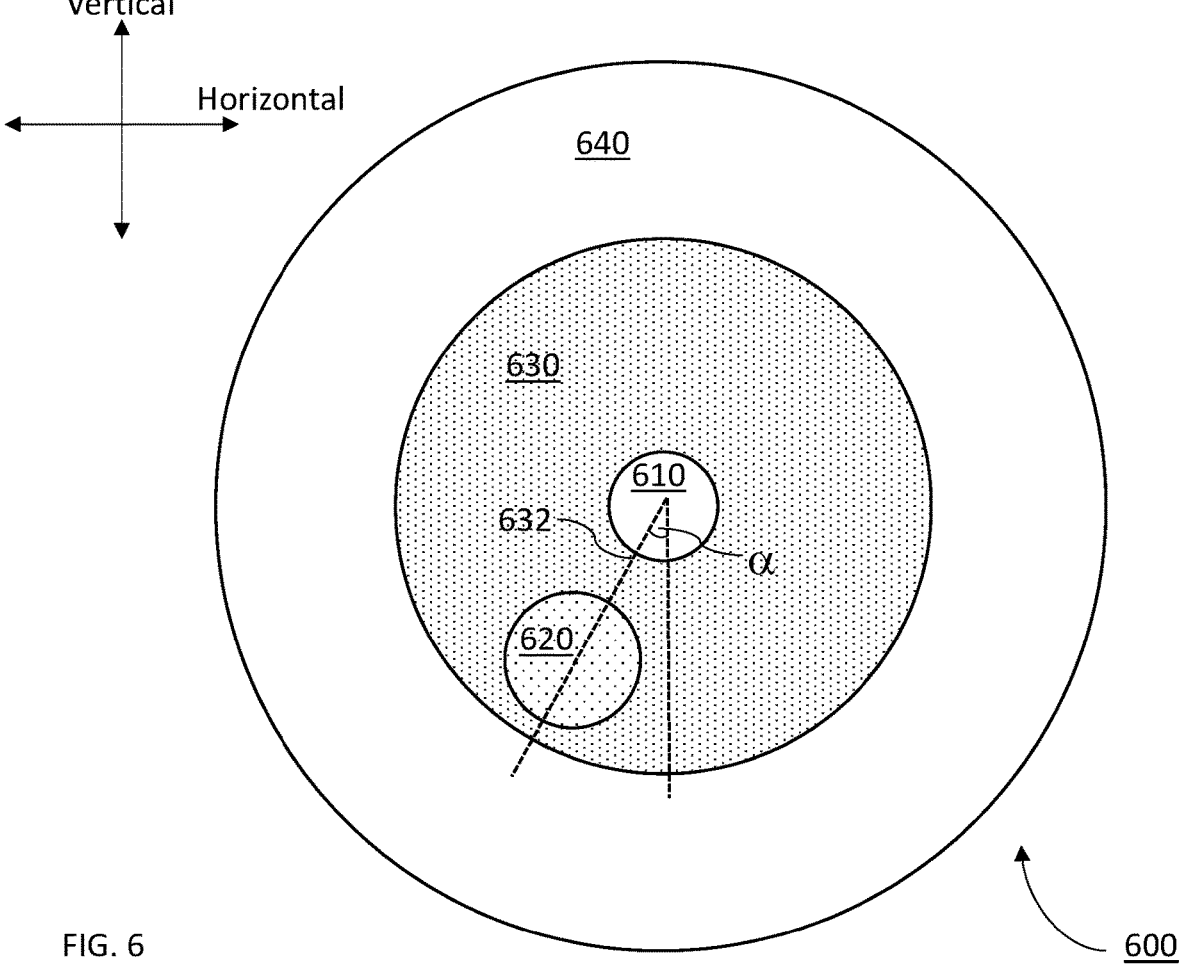
FIG. 6 is a plan view of another embodiment of an ophthalmic lens for treating myopia.

While the foregoing examples include clear apertures (i.e., apertures devoid of scatters) for both near and distance vision, other implementations are also possible. For example, referring to FIG. 6, an ophthalmic lens 600 includes a first clear aperture 610 and a circular light scattering area 630 surrounding the first clear aperture 610. First clear aperture 610 is positioned substantially near the center of lens 600 for distance vision. Scattering area 630 is also substantially centered with respect to the lens center. Scattering area 630 is also surrounded by a clear area 640.

Rather than a second clear aperture, lens 600 includes an area 620 with different scattering properties compared to light scattering area 630 positioned for near-vision. For example, area 620 can provide less light scattering compared to area 630 such that a contrast reduction of images viewed through area 620 are not as substantial as images viewed through area 630. In some embodiments, area 620 can have a lower density of light scattering centers compared to area 630. Alternatively, or additionally, the size and/or shape of light scattering centers in area 620 can be different than the size and/or shape of light scattering centers in area 630. Area 620 is aligned along an axis 632 that is offset by an angle, a, from the vertical axis of the lens.

Figure 7:
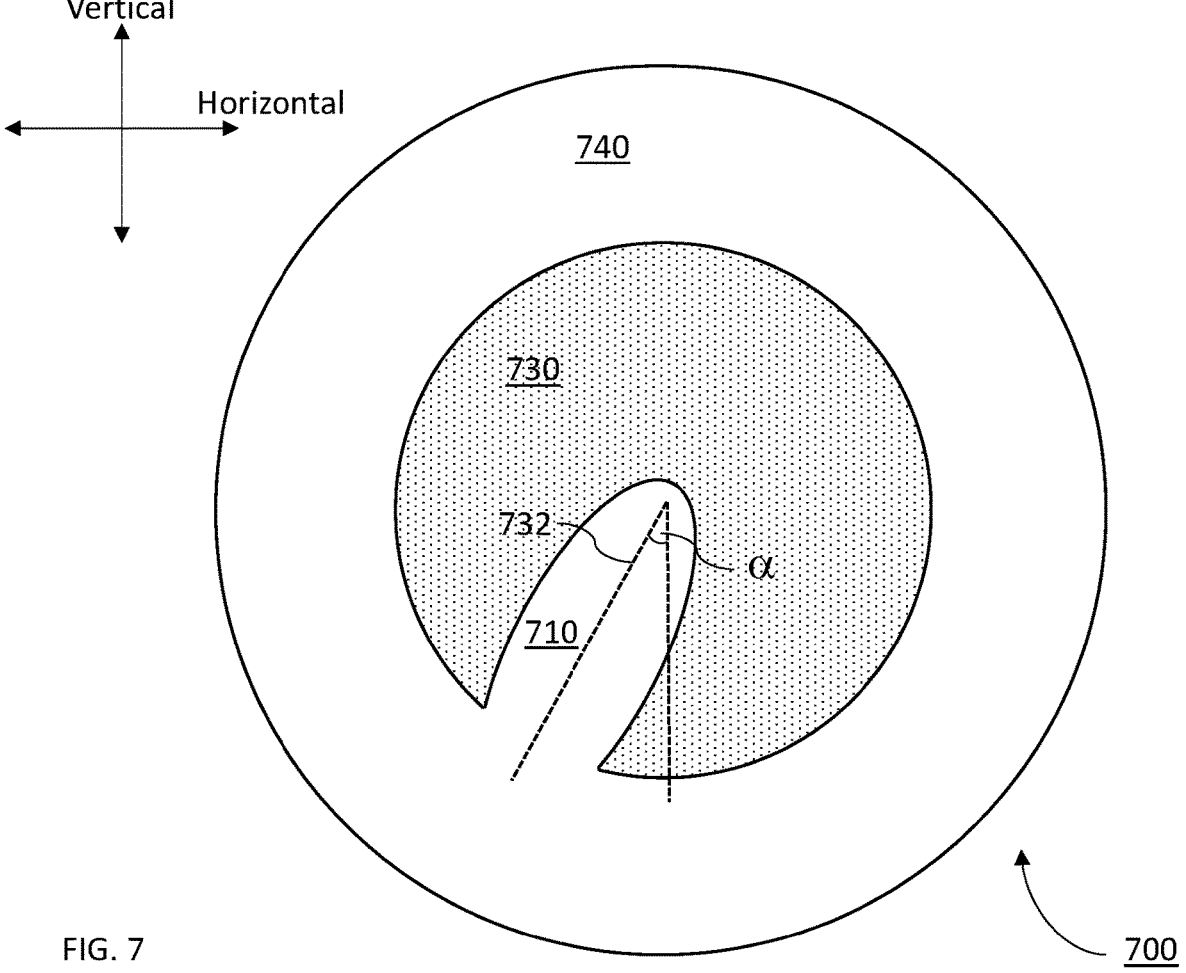
FIG. 7 is a plan view of a further embodiment of an ophthalmic lens for treating myopia.

Light scattering area 630 includes scattering centers which scatter at least some of the light In some embodiments, the near-vision aperture can extend to the edge of the scattering area of the lens. For example, referring to FIG. 7, an ophthalmic lens 700 includes a clear elliptical aperture 710 and a circular light scattering area 730 surrounding the clear aperture 710. The circular light scattering area 730 is substantially centered with respect to the lens center. Scattering area 730 is also surrounded by a clear area 740.

One end of the clear aperture 710 is positioned near the center of the lens, while the aperture 710 extends radially to the edge of light scattering area 730 and into the clear area 740, encompassing both the distance-vision area near the center of the lens and the near-vision area of the lens near the edge of the circular light scattering area 730. The clear aperture 710 extends out along an axis 732 that is offset by an angle, α, from the vertical axis of the lens.

As noted previously, while clear aperture 710 is elliptical in shape, other shapes are possible (e.g., polygonal or any other shape).

In the foregoing embodiments, the ophthalmic lens is a single vision, toric, aspheric or optically neutral or plano (i.e., no optical power) lens. More generally, other embodiments are also possible. For instance, multifocal lenses such as bifocal (e.g., prismatic bifocals), trifocal, multi-focal, freeform or progressive lenses can be used.

Figure 8:
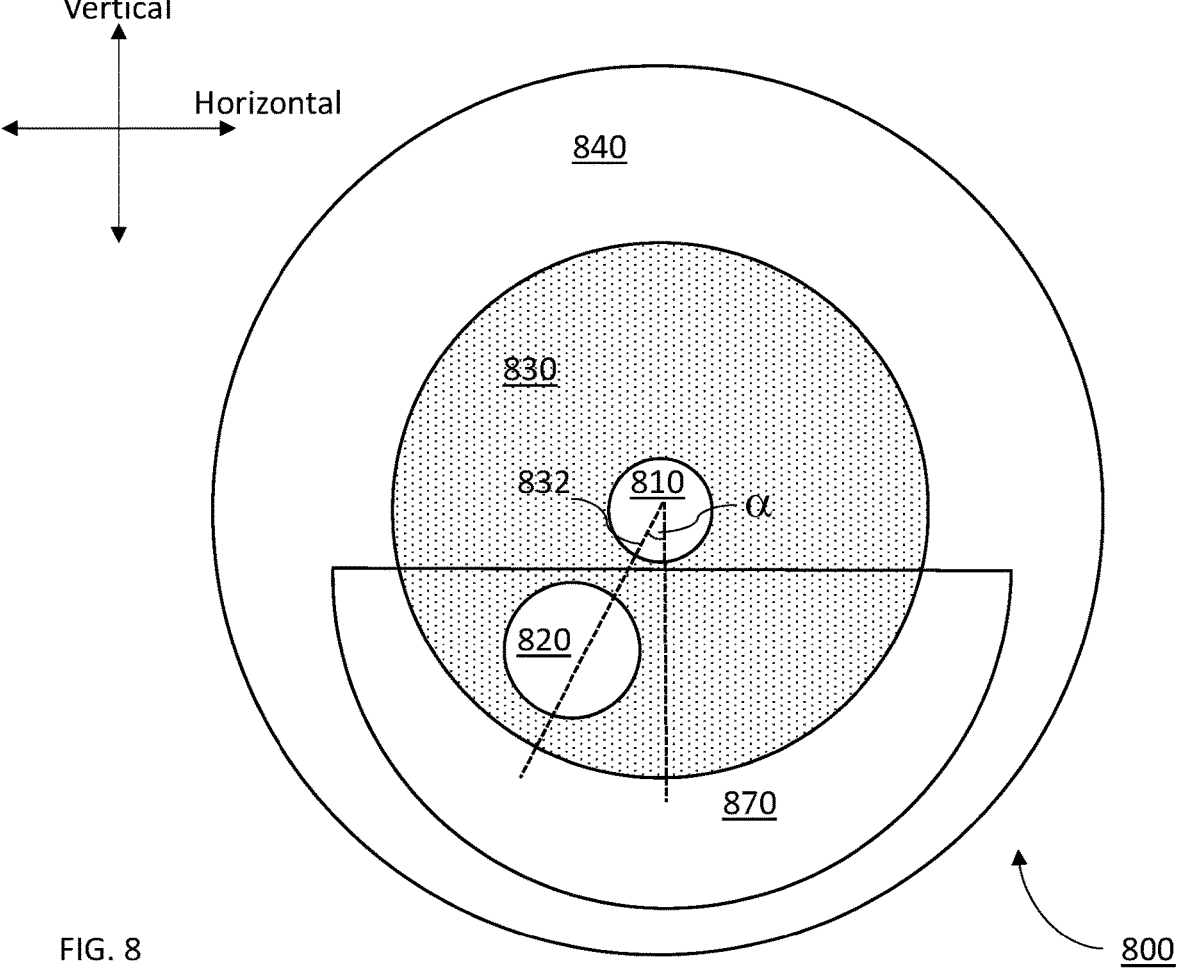
FIG. 8 is a plan view of another embodiment of an ophthalmic lens for treating myopia.

As an example, referring to FIG. 8, bifocal lens 800 has two areas of differing optical power. Bifocal ophthalmic lens 800 includes a first clear aperture 810, for distance vision, and a circular light scattering area 830 surrounding the first clear aperture 810. Scattering area 830 is also surrounded by a clear area 840. A second clear aperture 820, for near-vision, is also provided in light scattering area 830, aligned along an axis 832 that is offset by an angle, α, from the vertical axis of the lens. A near-vision area 870 occupies a lower area of the lens (with respect to the vertical axis), and has an optical power selected to facilitate near-vision tasks. Near-vision aperture 820 is located in this area of the lens. The near-vision lens area 870 overlaps near-vision aperture 820, and can be larger than the aperture (as shown in FIG. 8), about the same size as, or smaller than the near-vision aperture 820. Near vision area 870 can have an add power of +0.25 D or more (e.g., +0.5 D or more, +0.75 D or more, +1.0 D or more, +1.25 D or more, +1.5 D or more, +2 D or more, +2.5 D or more, +3 D or more; such as up to +5 D, for example) over the base curve.

When multi-focal lenses are used, the near-vision lens area serves two functions. When the viewer is looking through the distance viewing aperture, the near-viewing area provides peripheral defocus. Peripheral defocus is known to reduce myopic progression, for example as described in U.S. Pat. No. 7,025,460. When the viewer is looking through the near-vision aperture, the near-vision lens area typically contains positive lens power (i.e., it has more dioptric focusing compared to the distance viewing portion of the lens) to help the user focus for near vision tasks.

The rest of the lens area has a different optical power selected for distance vision task. Aperture 810 is located in the distance vision lens area.

In some embodiments, a prismatic bifocal lens can be used. For instance, a 1-Δ or more (e.g., 2-Δ or more, 3-Δ or more, 4-Δ or more; such as up to 5-Δ) base-in prism can be added to near vision area 870. Use of prismatic bifocals can reduce myopic progression in children compared to use of normal bifocals and that including base-in prism with a scattering area may provide further benefit in this respect.

Figure 9:
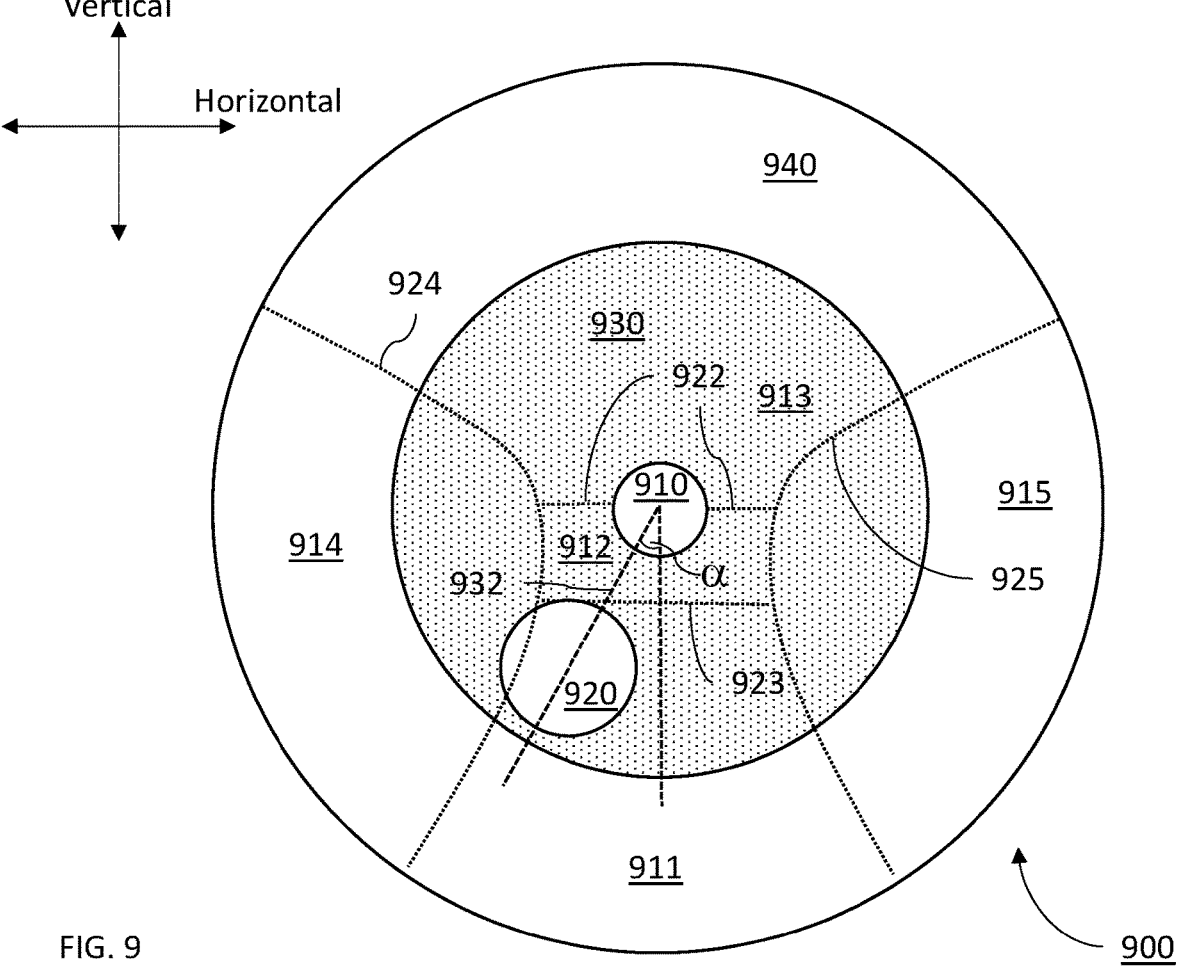
FIG. 9 is a plan view of another embodiment of an ophthalmic lens for treating myopia.

Referring to FIG. 9, a progressive lens 900 can also be used. Progressive lenses are typically characterized by a gradient of increasing lens power, added to the wearer's correction for the other refractive errors. The gradient starts at the wearer's distance prescription at the top of the lens and reaches a maximum addition power, or the full reading addition, lower in the lens to match the natural path of the eye as it focuses on near objects. The length of the progressive power gradient on the lens surface generally depends on the design of the lens, with a final addition power usually between 0.75 and 3.50 diopters.

As illustrated, lens 900 includes five different zones, separated by dotted lines 922, 923, 924, and 925 in the figure. These include a near-viewing zone 911, an intermediate zone 912, a distance-viewing zone 913. Such a lens may also include peripheral distortion zones 914 and 915. Although demarcated by dotted lines, the variation in optical power from one zone to the next is typically gradual.

With respect to the scattering/clear properties of the lens, progressive ophthalmic lens 900 includes a clear outer region 940, a light scattering area 930, and a first clear aperture 910 for distance vision and a second clear aperture 920 for near vision. Second clear aperture 920 is aligned along an axis 932 that is offset by an angle, $\alpha$, from the vertical axis of the lens. Distance vision clear aperture 910 overlaps (in this case, partially) with distance-viewing zone 913 of the progressive lens, while near vision aperture 920 overlaps with near-viewing zone 911.

In general, any of the clear aperture arrangements disclosed can be used with a multifocal lens (e.g., a bifocal or progressive lens). Furthermore, in some embodiments when a multifocal lens is used, second clear aperture (e.g., aperture 920 in lens 9000 is aligned specifically on an area of the lens having add power for near vision. For example, the location of the second aperture can have an optical power of +0.25 D (e.g., +0.5 D or more, +0.75 D or more, +1.0 D or more, +1.25 D or more, +1.5 D or more, +1.75 D or more, +2.0 D or more) or more compared to the optical power of the lens at the first clear aperture (i.e., the aperture for distance vision).

Figure 10:
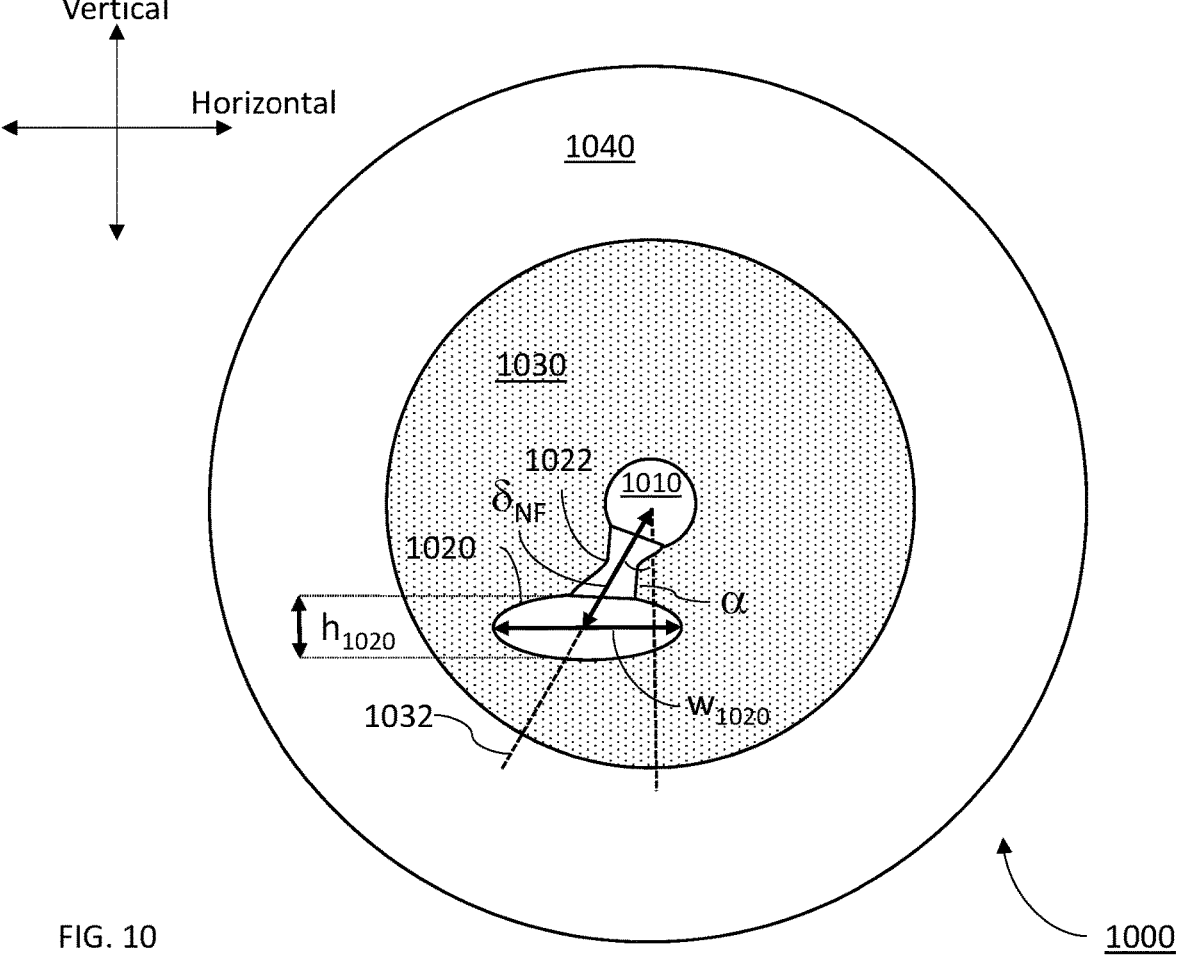
FIG. 10 is a plan view of another embodiment of an ophthalmic lens for treating myopia.

FIG. 10 shows a further example of an ophthalmic lens 1000 having an on-axis clear aperture 1010 and a second clear aperture 1020 offset from the axis by distance $\delta_{NF}$ along direction 1032. Apertures 1010 and 1020 are linked by a clear neck 1022, providing a combined clear aperture having a dumbbell shape within a scattering area 1030. Scattering area 1030 is surrounded by a clear area 1040. Aperture 1020, which is aligned for near vision activities, such as reading, has a horizontal width $w_{1020}$ that is substantially larger than its vertical height, $h_{1020}$. For example, $w_{1020}$ can be $1.5 \times h_{1020}$ or more (e.g., $1.8 \times h_{1020}$ or more, $2 \times h_{1020}$ or more, $2.5 \times h_{1020}$ or more, $3 \times h_{1020}$ or more, e.g., up to $5 \times h_{1020}$). In some embodiments, $w_{1020}$ can correspond to the solid angle spanned by a user's eye when reading a standard page of text at a typical reading distance. The solid angle can be $\pm 10°$ or more $\pm 12°$ or more, $\pm 15°$ or more).

Figure 11:
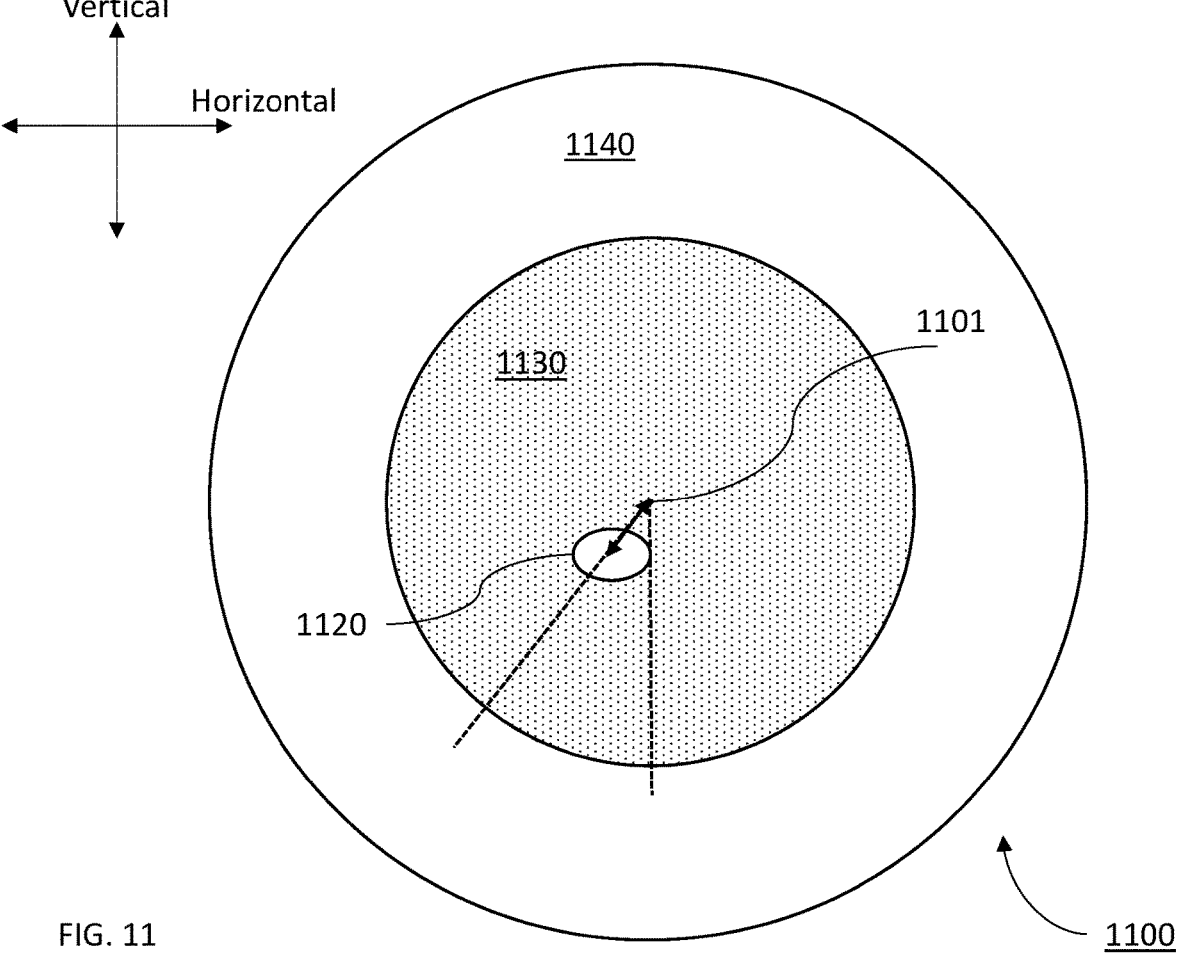
FIG. 11 is a plan view of another embodiment of an ophthalmic lens for treating myopia.

The foregoing example lenses all include a clear aperture for distance vision, which typically located at the center of the lens. However, other embodiments are also possible. For example, referring to FIG. 11, in some embodiments, a lens can include a clear aperture located only at the near-vision axis, not the distance vision axis. Here, an ophthalmic lens 1100 includes a single clear aperture 1120, the center of which is offset from a central lens axis 1101 (e.g., by an amount $\delta_{NF}$ as discussed above).

Figure 12:
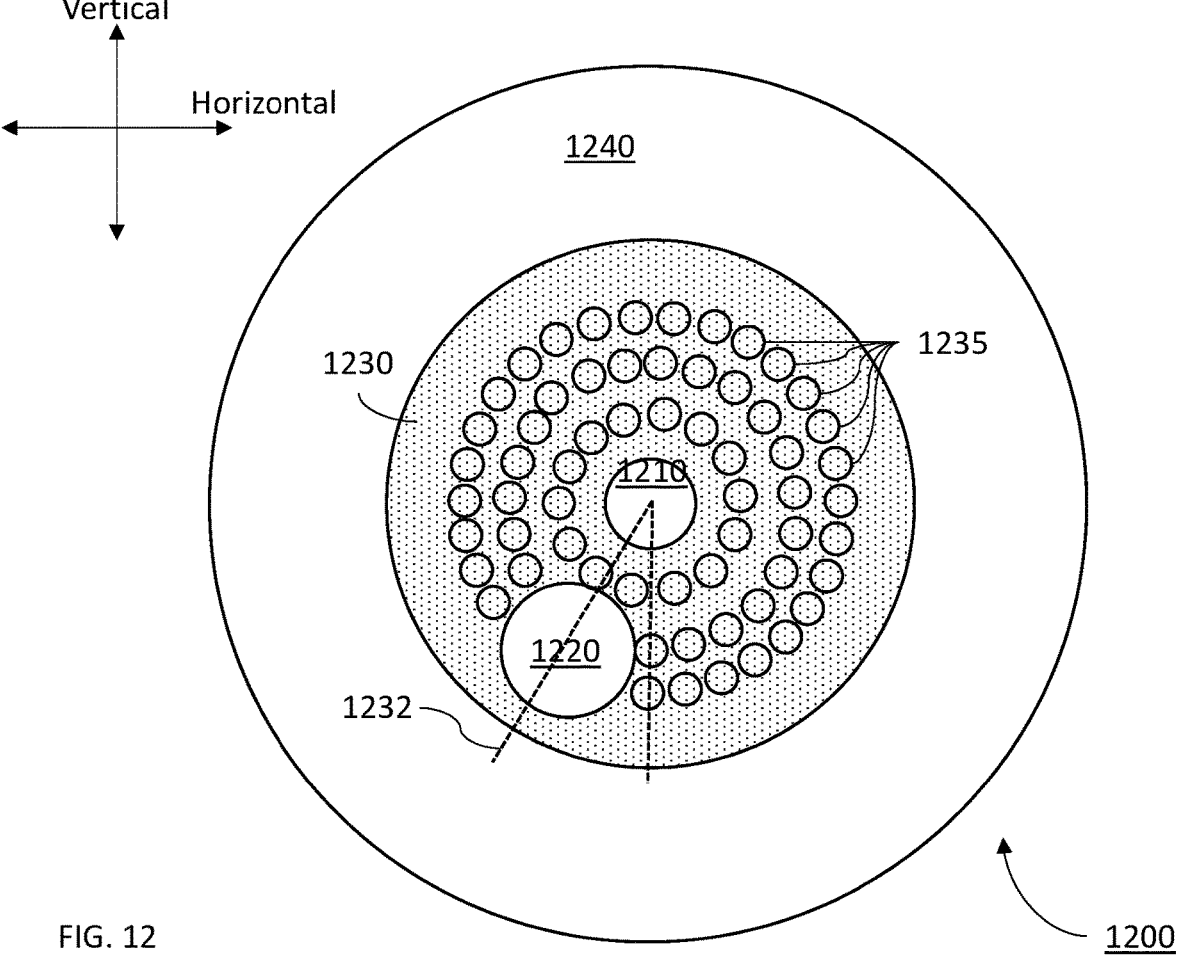
FIG. 12 is a plan view of another embodiment of an ophthalmic lens for treating myopia.

Furthermore, while the foregoing embodiments feature a scattering area having features (i.e., scattering centers) that scatter, rather than focus, incident light, other implementations are also possible. For example, a lens can include one or more lenslets having an optical power different from the base lens in the areas identified as "scattering areas" in the embodiments described above. Examples of such lenslets are disclosed, for example, in U.S. Pat. No. 10,268,050 entitled "Spectacle Lens" issued on Apr. 23, 2019, and in PCT Publication WO 2019/166653, entitled "Lens Element" published on Sep. 6, 2019. Referring to FIG. 12, an example lens 1200 includes a clear outer region 1240, a light scattering area 1230, a first clear aperture 1210 for distance vision and a second clear aperture 1220 for near vision. Second clear aperture 1220 is aligned along an axis 1232 that is offset by an angle, $\alpha$, from the vertical axis of the lens.

Generally, the optical properties of lenslets can vary depending on the degree of defocus considered appropriate for a user. For example, the lenslets can be spherical or aspherical. The lenslets can have positive or negative optical power. In some embodiments, the optical power of the lenslets is zero (e.g., wherein the base power of the lens is strongly negative). The lenslets have each have the same optical power or different lenslets can have differing optical power. In some embodiments, lenslets can have an add power of +0.25 D or more (e.g., +0.5 D or more, +0.75 D or more, +1.0 D or more, +1.25 D or more, +2.5 D or more, +1.75 D or more, +2.0 D or more, +3.0 D or more, +4.0 D or more; such as up to +5.0 D) compared to the base optical power of the lens. In certain embodiments, lenslets can have an add power of −0.25 D or less (e.g., −0.5 D or less, −0.75 D or less, −1.0 D or less, −1.25 D or less, −1.5 D or less) compared to the base optical power of the lens The size of the lenslets can also vary as appropriate. The lenslets can have a diameter of 0.5 mm or more (e.g., 0.8 mm or more, 1 mm or more, 1.5 mm or more, 2 mm or more, 3 mm or more; such as up to 5 mm).

Scattering area 1230 includes scattering centers as described above. In addition, scattering area 1235 includes lenslets 1235 arranged in rings around aperture 1210. The lenslets introduce defocus to portions of a wavefront that would otherwise be focused onto the user's retina. Scattering centers are included at the locations of lenslets 1235. For example, scattering centers can be formed on a surface of each lenslet 1235, on the opposite lens surface but overlapping with the same lateral positions as lenslets 1235, and/or included within the bulk of lens 1200 overlapping laterally with lenslets 1235. In some embodiments, scattering centers are included between lenslets 1235, but do not laterally overlap with the lenslets. In certain embodiments, the scattering area of the lens includes only lenslets, but not additional scattering centers.

In some embodiments, the lens can be a digitally surfaced lens. Such lenses are tailored for each individual wearer and fabricated based on the wearer's prescription with computer-controlled surfacing equipment that is more precise than conventional tools. Digital lenses fabrication technology can allow for surfacing of lenses in power increments of 0.01 diopter, compared with 0.125 to 0.25 diopter increments typically possible with traditional eyeglass lens tooling. The fabrication of digital lenses can account and be customized for a variety of factors, such as: (i) the lenses position in front of the wearer's eyes in the eyeglass frame to provide the most accurate lens power; (ii) the angle between the eye and the back surface of the lens in different gaze positions (for example, when the wearer is looking off to the side rather than straight through the center of the lens); (iii) the frame size; and/or (iv) the position of the wearer's pupil within the frame outline. In general, digital lenses can be single vision lenses, freeform or multifocal lenses.

While the prior examples utilizing multifocal lenses each include two discrete circular apertures, more generally, the principles and aperture arrangements described with respect to the single vision lenses above (e.g., as shown in FIGS. 3, 5, 7, 10 and other irregular shapes) can be similarly applied to multifocal lenses.

Furthermore, in general for the lenses described above, patterns of scattering centers suitable for the light scattering area are described, for example, in PCT Application WO 2018/026697, entitled "OPHTHALMIC LENSES FOR TREATING MYOPIA," filed on Jul. 31, 2017, and in Provisional Application No. 62/671,992, entitled "OPHTHALMIC LENSES WITH LIGHT SCATTERING FOR TREATING MYOPIA," filed May 15, 2018. The contents of both of these applications are hereby incorporated by reference in their entirety.

Generally, the lenses described herein can be formed in a variety of ways, such as using the methods disclosed in PCT Application WO 2018/026697, entitled "OPHTHALMIC LENSES FOR TREATING MYOPIA," filed on Jul. 31, 2017, in Provisional Application No. 62/671,992, entitled "OPHTHALMIC LENSES WITH LIGHT SCATTERING FOR TREATING MYOPIA," filed May 15, 2018, and in U.S. Patent Publication No. US-2019-0235279-A1, entitled "OPHTHALMIC LENSES WITH LIGHT SCATTERING FOR TREATING MYOPIA," published on Aug. 1, 2019.

Also, while the apertures described above are generally clear apertures (i.e., free of scattering centers), more generally the apertures can correspond to areas have scattering centers but sized and arranged so that the amount of light scattering is reduced compared to a scattering region.

EXAMPLE

Figure 13:
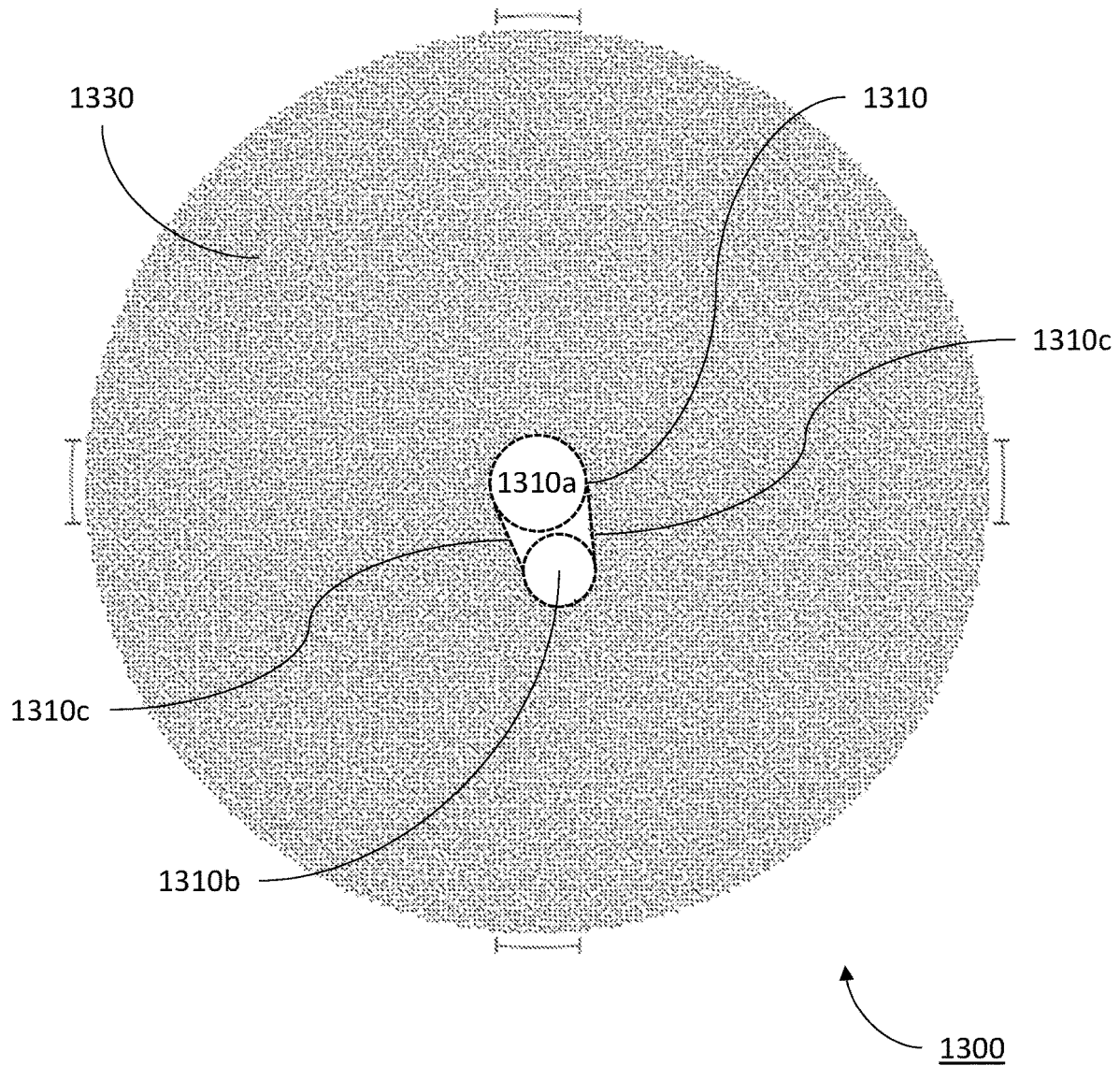
FIG. 13 is an example of a scattering center pattern for an ophthalmic lens for treating myopia.

Referring to FIG. 13, an example pattern for scattering centers is shown for a lens 1300, and includes a clear aperture 1310 and a scattering area 1330 surrounding the clear aperture. Clear aperture 1310 is constituted of two circles 1310*a* and 1310*b* with their centers offset by 6.5 mm along an angle, $\alpha$, of 14°. Circle 1310*a* is centered on the lens axis corresponding to the distance vision direction and has a 7 mm diameter. Circle 1310*b* has a 5 mm diameter. The perimeter of clear aperture 1310 follows circles 1310*a* and 1310*b* at the opposite sides of the aperture and follows tangential lines 1310*c* connecting the two circles between the circles.

Scattering area 1330 is constituted of ink jet printed scattering centers, printed according to the pattern described shown in FIG. 5B in U.S. Patent Publication No. US-2019-0235279-A1.

Other embodiments are in the following claims.

What is claimed is:

1. An ophthalmic lens, comprising:
   a lens material having two opposing curved surfaces, the curved surfaces defining a lens optical axis perpendicular to a first of the curved surfaces where the lens optical axis intersects a first curved surface of the curved surfaces;
   a light scattering region comprising light scattering centers, the light scattering region being defined by a first continuous portion of the lens in which the light scattering centers are spaced apart from each other by 2 mm or less; and
   an elongate, clear aperture that is decentered from the lens optical axis and completely surrounded by the light scattering region, wherein the clear aperture is defined by a second continuous portion of the lens different from the first continuous portion, the second continuous portion being free of the light scattering centers.

2. The ophthalmic lens of claim 1, further comprising a clear area surrounding the light scattering region, wherein the clear aperture is continuous with the clear area.

3. The ophthalmic lens of claim 1, wherein the light scattering region comprises optical structures sized and arranged to reduce contrast of an image viewed through the light scattering region compared with the clear aperture.

4. The ophthalmic lens of claim 1, wherein the lens has a region having a first optical power at the lens optical axis and a region having a second optical power different from the first optical power, and the clear aperture overlaps with both regions.

5. The ophthalmic lens of claim 4, wherein the first optical power is selected to correct for a refractive error of a user for distance vision.

6. The ophthalmic lens of claim 4, wherein the second optical power is selected to correct for a refractive error of a user for near vision or magnify to aid in near vision work.

7. The ophthalmic lens of claim 4, wherein the ophthalmic lens is a progressive or freeform lens.

8. The ophthalmic lens of claim 4, wherein the ophthalmic lens is a bifocal lens.

9. The ophthalmic lens of claim 8, wherein the bifocal lens is a prismatic bifocal lens.

10. Eyeglasses comprising the ophthalmic lens of claim 1.

11. The eyeglasses of claim 10, wherein an aperture axis intersects, at a non-zero angle, $\alpha$, a vertical axis of a frame of the eyeglasses that is perpendicular to the lens optical axis.

12. The eyeglasses of claim 11, wherein the angle, $\alpha$, corresponds to a path of a natural vergence path of a user's eyes when switching from distant vision to near vision.

13. The eyeglasses of claim 11, wherein $\alpha$ is in a range from 5° to 20°.

14. The eyeglasses of claim 11, wherein the clear aperture of the ophthalmic lens is elongated in the vertical axis of the frame of the eyeglasses.

15. The eyeglasses of claim 11, wherein the clear aperture of the ophthalmic lens is elongated in a horizontal axis of the frame of the eyeglasses.

16. The eyeglasses of claim 15, wherein the clear aperture elongated in the horizontal axis is located for near vision during use of the eyeglasses.

17. The ophthalmic lens of claim 1, wherein the clear aperture has an elliptical shape.

* * * * *